United States Patent [19]

Uchida et al.

[11] 3,984,753

[45] Oct. 5, 1976

[54] AC/DC POWER SOURCE APPARATUS

[75] Inventors: Ryohei Uchida; Mitsuru Kitano; Yoshinoku Morimote, all of Himeji, Japan

[73] Assignee: Mitsubishi Denki Kabushiki Kaisha, Japan

[22] Filed: May 1, 1975

[21] Appl. No.: 573,395

[30] Foreign Application Priority Data

| | | |
|---|---|---|
| May 3, 1974 | Japan | 49-49586 |
| June 13, 1974 | Japan | 49-67751 |
| June 13, 1974 | Japan | 49-67764 |
| July 24, 1974 | Japan | 49-84784 |
| July 31, 1974 | Japan | 49-88203 |
| Aug. 12, 1974 | Japan | 49-92536 |
| Aug. 12, 1974 | Japan | 49-96579[U] |
| Aug. 29, 1974 | Japan | 49-103560[U] |
| Oct. 8, 1974 | Japan | 49-115971 |
| Dec. 17, 1974 | Japan | 49-145272 |
| Dec. 27, 1974 | Japan | 50-2622 |
| Feb. 15, 1975 | Japan | 50-19291 |

[52] U.S. Cl. ............................................. 321/47
[51] Int. Cl.² ..................................... H02M 7/155
[58] Field of Search .............. 307/64, 66, 80, 240, 307/252 M; 321/43, 44, 45 C, 47

[56] References Cited

UNITED STATES PATENTS

| | | | |
|---|---|---|---|
| 3,434,034 | 3/1969 | Garber et al. | 321/43 |
| 3,873,846 | 3/1975 | Mario et al. | 307/80 X |

Primary Examiner—William M. Shoop
Attorney, Agent, or Firm—Robert E. Burns; Emmanuel J. Lobato; Bruce L. Adams

[57] ABSTRACT

A series combination of thyristor and diode is connected across another series combination of thyristor and diode to form a bridge circuit. Serially connected reactor and capacitor are connected across one of the thyristor in the chopping control mode in the use of a DC source and disconnected from both thyristors in the phase control mode in the use of an AC source in order to drive a DC motor by either of the DC and AC sources. A battery can be connected across the bridge circuit through the DC motor. Either one of the series combinations may be formed of the diode and two thyristors one of which is always connected across the serially connected reactor and capacitor.

14 Claims, 40 Drawing Figures

A  VOLTAGE ACROSS CAP. 8
B  OSCILLATING CURRENT THROUGH REACTOR 74 CAPACITOR 8
C  CURRENT THROUGH THYRISTOR 20
D  VOLTAGE ACROSS THYRISTOR 20
E  COMMUTATION CURRENT THROUGH DIODE 10
F  LOAD CURRENT THROUGH MOTER 11

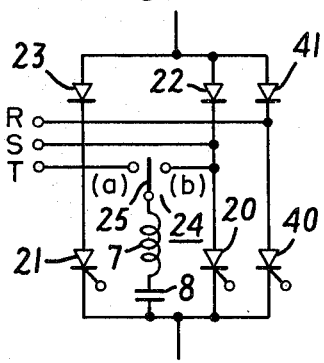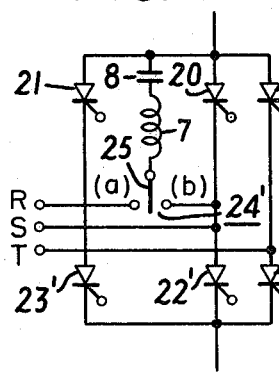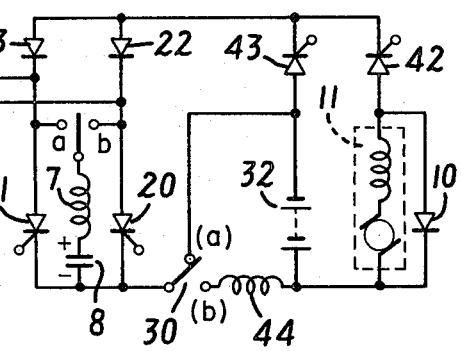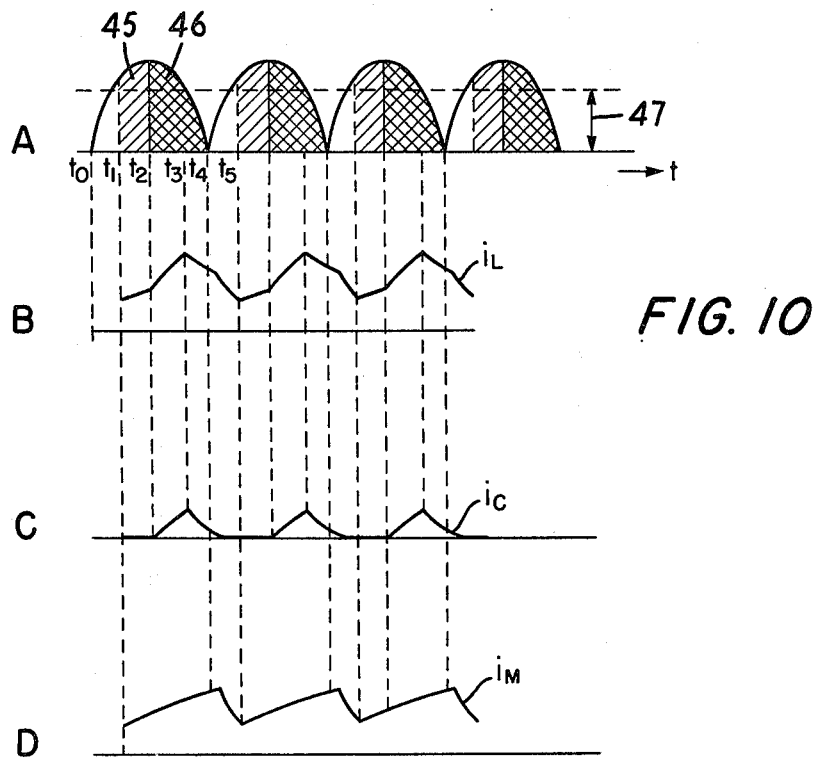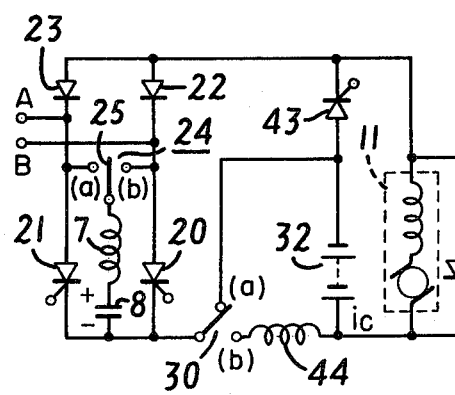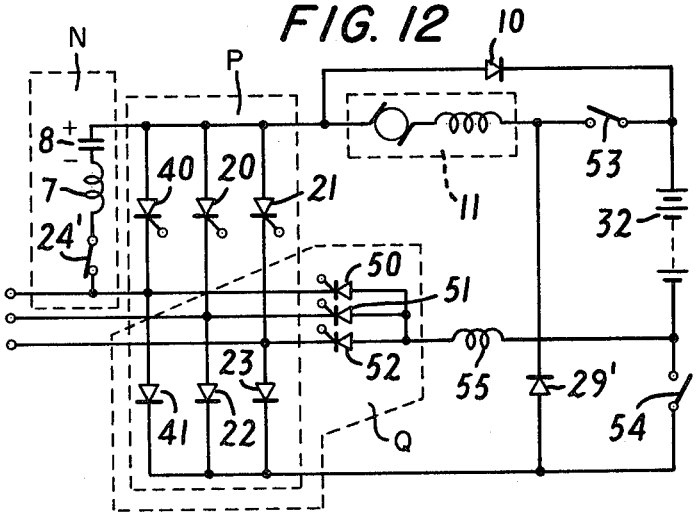

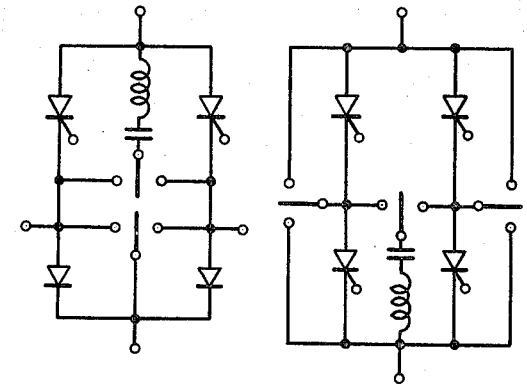
FIG. 22a  FIG. 22b
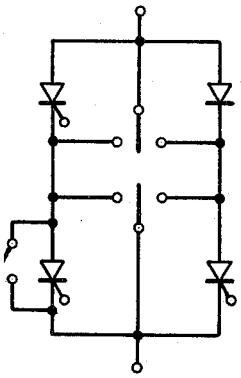
FIG. 22c
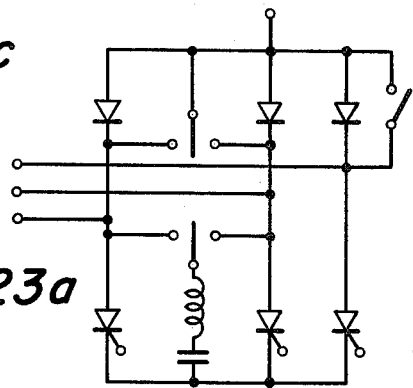
FIG. 23a
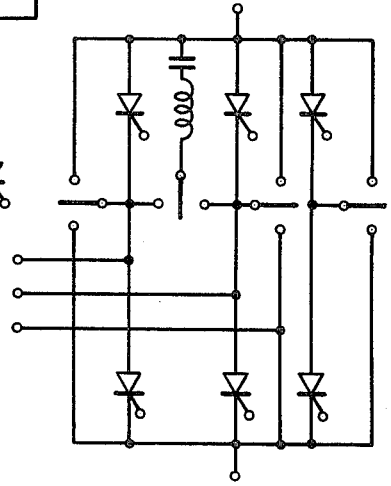
FIG. 23b
FIG. 22d
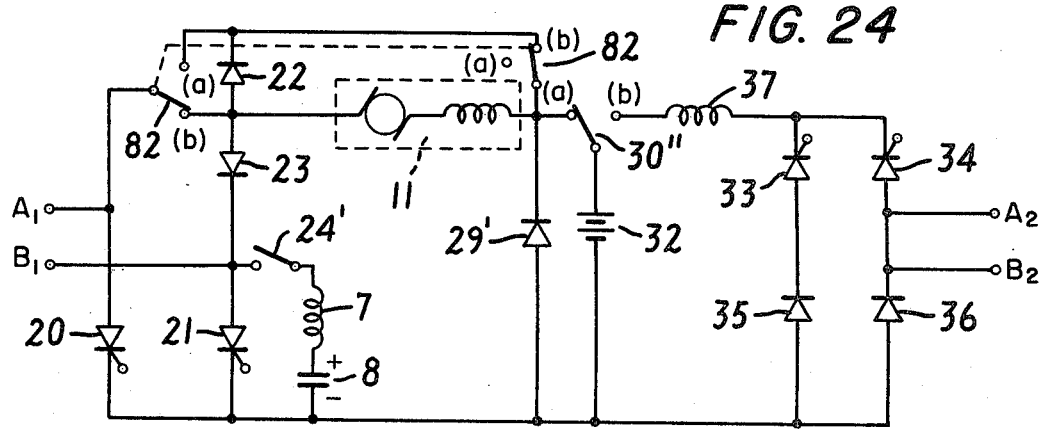
FIG. 24

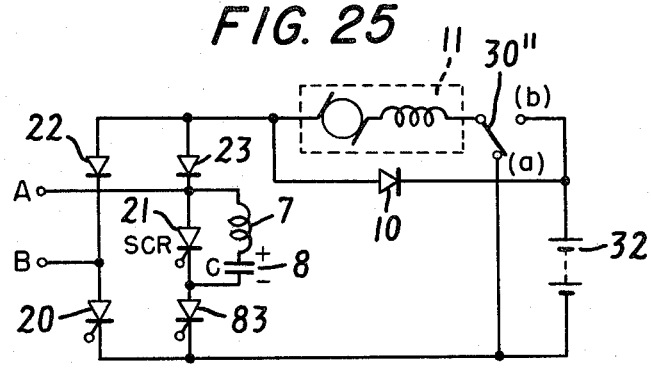
FIG. 25
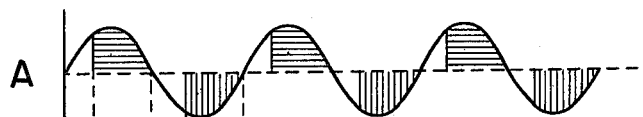
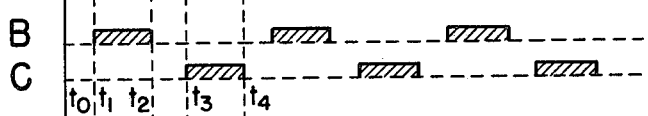
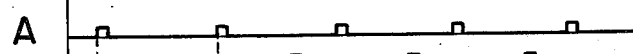
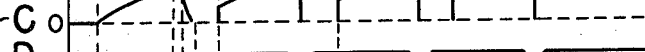
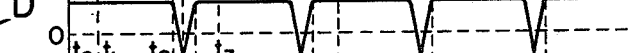
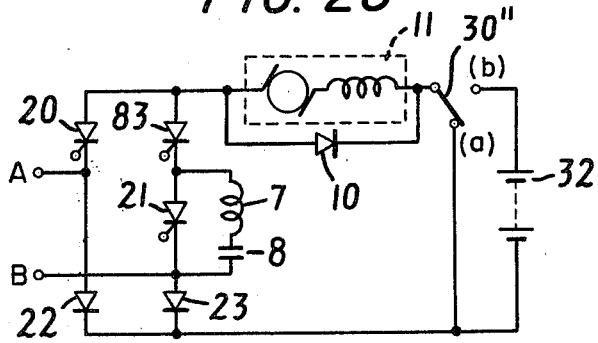
FIG. 28
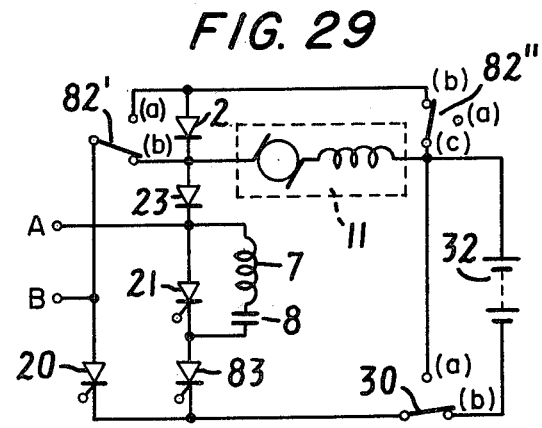
FIG. 29

3,984,753

AC/DC POWER SOURCE APPARATUS

BACKGROUND OF THE INVENTION

This invention relates to an AC/DC power source apparatus for supplying a DC power to a DC load from an electric power source of either DC type or AC type and more particularly to means for controlling a DC power supplied from either of DC and AC power sources.

Conventional AC/DC power source apparatus of the type referred to have generally comprised the chopper device for effecting the power running control of the DC load such as DC motor energized by the battery disposed therein, and the rectifier devices for producing a DC power from an AC power source in order to drive the DC load while requiring the phase control device for exclusively charging the battery whenever it is desired to do so. The rectifier devices have been required to be substantially equal in current capacity to the chopper device resulting in the large-sized construction unsuitable for use as an electric equipment disposed on an electric motor vehicle.

Accordingly it is an object of the present invention to provide a new and improved AC/DC power source apparatus for supplying a DC power to a DC load from either of a DC and an AC power source with a small-sized in expensive construction including a minimum number of high power elements.

SUMMARY OF THE INVENTION

The present invention provides an AC/DC power source apparatus for supplying a DC power to a DC load from either of AC and DC power source means. The apparatus comprises AC input terminal means adapted to be connected to AC power source means, and rectifier bridge circuit means connected to the AC terminal means to rectify an alternating current supplied thereto through the AC terminal means and to supply an rectified output to DC load means. DC input terminal means is connected to the output of the bridge circuit means and also to DC power source means, and circuit means is connected across the DC input terminal means to permit the passage of the alternating current therethrough but to prevent the passage of a direct current therethrough.

One feature of the present invention is to operate one portion of the rectifier bridge circuit means with each of the alternating and direct currents.

Another feature of the present invention is the provision of charging control means exclusively used to charge a battery involved when an associated motor vehicle is traveling along a track, and of power control means including common elements forming both the main circuit effecting the phase control of an input alternating current and the main circuit for effecting the power control of an input direct current from the battery.

Still another feature of the present invention is to use chopper means for effecting the power running control as rectifier means for an AC source while permitting to control the charging of the battery independently of the phase control for a DC motor involved.

A further feature of the present invention is the provision of means for continuing the travel of an associated electric motor vehicle even after some of those elements forming the rectifier bridge circuit means has been out of order with a DC power source used.

Another feature of the present invention is to use chopper means for effecting the power running control of the DC load energized by a battery involved as phase control means operative with an AC power source energizing the DC load. While charging means for exclusively charging the battery and the power running control means include partly common elements and reactor means required for charging the battery with a constant current during the operation by an AC power source is also used as reactor means for suppressing a current rise in the power running control means during the operation by the battery.

A separate feature of the present invention is to effect both the chopping control and the phase control by common means small in size and less in the number of switching points.

An additional feature of the present invention is to control the firing timing of thyristors involved with a simple construction.

BRIEF DESCRIPTION OF THE DRAWINGS

The present invention will become more readily apparent from the following detailed description taken in conjunction with the accompanying drawings in which:

FIGS. 8a and 8b are circuit diagrams of one portion of the arrangement of FIG. 7 modified to be used with the three-phase AC power source;

FIG. 9 is a schematic circuit diagram of another modification of the arrangement shown in FIG. 7 wherein the bridge circuit for controlling the DC motor also serves to charge the battery;

FIG. 10 is a graph illustrating current and voltage waveforms developed at various points in the arrangement shown in FIG. 9;

FIG. 11 is a schematic circuit diagram of a modification of the arrangement shown in FIG. 9;

FIG. 12 is a schematic circuit diagram of a modification of the arrangement shown in FIG. 7 and suitable for use with a three-phase AC power source;

FIGS. 22a through 22d are circuit diagrams of various modifications of the bridge circuit shown in FIG. 21;

FIGS. 23a and 23b are circuit diagrams of modifications of the bridge circuit shown in FIG. 21 and suitable for use with the three-phase AC power source;

FIG. 24 is a schematic circuit diagram of a modification of the arrangement shown in FIG. 13;

FIG. 25 is a schematic circuit diagram of another AC/DC power source apparatus constructed in accordance with the principles of the present invention;

FIGS. 26 and 27 are graphs illustrating waveforms developed at various points in the arrangement shown in FIG. 25 in different control modes of operation;

FIGS. 28 through 34 are views similar to FIG. 25 but illustrating various modifications of the arrangement shown in FIG. 25.

Throughout the Figures like reference numerals designate the identical or similar components.

DESCRIPTION OF THE PREFERRED EMBODIMENTS

Figure 1:
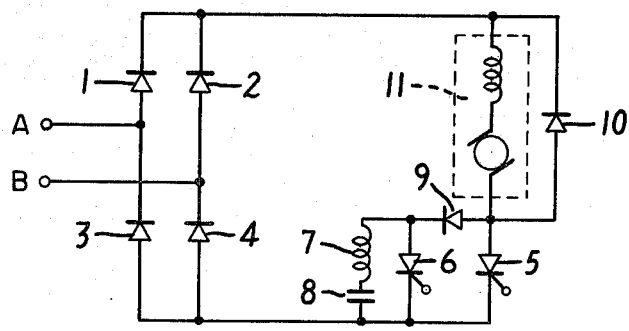
FIG. 1 is a schematic circuit diagram of a control system for controlling either of AC and DC power sources for driving a load constructed in accordance with the principles of the prior art.

For a better understanding of the nature of the present invention, the description will now be made in conjunction with conventional circuit for controlling either of an AC and a DC source. In a conventional arrangement as shown in FIG. 1 a direct current or an alternating current as the case may be applied, as a power source, across a pair of source terminals A and B subsequently connected to inputs to a rectifier bridge circuit including two pairs of serially connected semiconductor diodes 1 and 3 and 2 and 4. The rectifier bridge circuit has a pair of output terminals across which a parallel combination of a main thyristor 5, a commutation thyristor 6 and a series combination of commutation reactor 7 and capacitors 7 and 8 respectively is serially connected to a semiconductor diode 10 and also to a DC load shown as a DC motor 11. Then the anode electrodes of the thyristors 5 and 6 are connected to each other through a semiconductor diode 9. The serially connected reactor and capacitors 7 and 8 respectively form an auxiliary commutation circuit and also along with the components 5, 6 and 9 form a thyristor chopper circuit for controlling a power supplied to the DC motor 11.

With a direct current applied across the terminals A and B, the diode 1 or 2 is operative to take out a positive output from the particular DC power source (not shown) while the diode 4 or 3 is operative to return a current back to the negative terminal of the DC power source. The positive output from the diode 1 or 2 is controlled by the thyristor chopper circuit and then applied across the DC motor in the manner as will be described in detail and in conjunction with FIG. 2. The diode 10 serves as a commutation diode responsive to the OFF state of the thyristor chopper circuit to cause a flow of a current due to an inductance included in a circuit with the motor circuit therethrough.

The application of an alternating current across the source terminals A and B is somewhat different from the application of a direct current across the same terminals in that the diodes 1, 2, 3 and 4 are operative to full-wave rectify the alternating current. The rectified current is controlled in the same manner as above described in conjunction with the direct current.

In this case the unidirectional current from the rectifier bridge circuit is high in ripple because it has been only full-wave rectified. If the thyristor chopper circuit is to control such a unidirectional current then the simplest power control is to use the main thyristor as a switch alone in synchronization with the rippled current with the auxiliary commutation circuit omitted. Alternatively, the main thyristor 5 may be maintained in its conducting state while the thyristors are substituted for the pair of diodes 1 and 2 and/or the pair of diodes 3 and 4 to drive the DC motor 11 in the phase control mode due to the substituted thyristors. In the latter case, when a DC power source is available, the substituted thyristors may be used as diodes but the substitution of the thyristors for the diodes will become fruitless in the operation by the DC power source.

In either case, therefore, the arrangement of FIG. 1 has necessarily comprised thyristors, semiconductor diode and the associated components forming a thyristor chopper circuit and separate thyristors, semiconductor diodes and the associated components for rectifying an alternating current if present.

Figure 2:
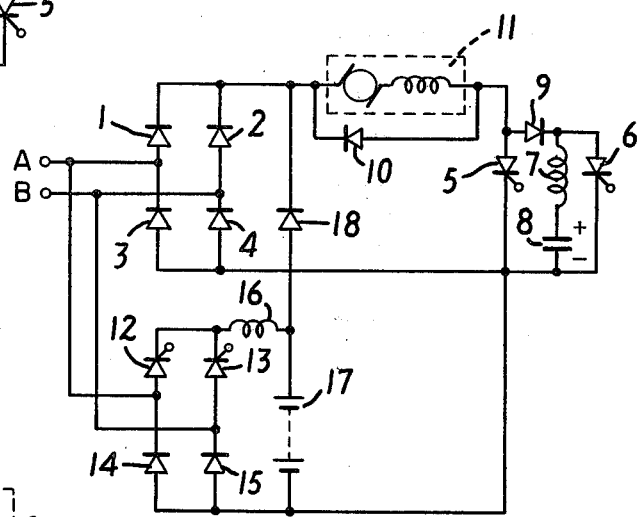
FIG. 2 is a circuit diagram similar to FIG. 1 but illustrating a modification of the arrangement of FIG. 1 including a DC source for driving the load and a charging circuit for charging the DC source.

The arrangement of FIG. 1 can be modified to include therein a DC power source for driving a DC load as shown in FIG. 2. The arrangement illustrated is different from that shown in FIG. 1 only in that in FIG. 2, a pair of thyristors 12 and 13 and a pair of semiconductor diodes 14 and 15 are connected together into a bridge circuit including a pair of inputs connected to the source terminals A and B, and a pair of outputs connected through a smoothing reactor 16 across a DC power source shown as being a battery 17. Then the battery 17 is connected to the junction of the DC motor 11 and the positive output of the rectifier bridge circuit through a semiconductor diode 18, so poled that a direct current flows to the motor therethrough.

Assuming that the arrangement of FIG. 2 is equipped on a motor vehicle (not shown), the operation will now be described. It is assumed that the vehicle travels along a road through the operation by the battery and that in the OFF state of the thyristors 5 and 6, a current from the battery 17 flows into the capacitor 8 through the diode 18 and the motor 11 to charge it with the polarity illustrated. Under the assumed condition, the application of a gating signal to the main thyristor 5 causes the latter to be turned on. This turn-on of the main thyristor 5 initiates a flow of driving current through a current path traced from the positive terminal of the battery 17 through the diode 18, the motor 11, the now conducting thyristor 5 and thence to the battery 17 at the negative terminal. Thus, the motor 11 is driven. Under these circumstances, an electric charge accumulated on the capacitor 8 remains intact because the diode 9 is effective for preventing the discharge of the capacitor 8.

Upon the current reaching a predetermined magnitude, a gating signal is applied to the commutation thyristor 6 to turn it on. This turn-on of the commutation thyristor 6 permits the capacitor 8 to discharge through the reactor 7 and the now conducting thyristor 6. More specifically, the charge on the capacitor 8 causes a flow of oscillating current through an L-C resonance circuit including the commutation thyristor 6, the reactor 7 and the capacitor 8. This oscillating current flows through a current loop traced from the positively charged side of the capacitor 8 through the reactor 7, the thyristor 6 and thence back to the capacitor 8 on the negatively charged side in one positive half-cycle thereof. At the end of this positive half cycle, the capacitor 8 is charged with the polarity reversed from that illustrated and to a magnitude substantially equal to the original positive magnitude.

Then the oscillating current flowing through the resonance circuit enters the next negative half cycle in which it is inverted in polarity. At that time the thyristor 6 is applied with a reverse voltage substantially equal to the voltage across the capacitor 8 to be turned off. Also the main thyristor 5 is applied with a reverse voltage substantially equal to that applied to the thyristor 6 to be turned off. Therefore, in the negative half cycle thereof the oscillating current flows through a current loop traced from the positive side of the battery 17 through the diode 18, the DC motor 11, the diode 9, the reactor 7, the capacitor 8 and thence the negative side of the capacitor 8 and equals in magnitude the load current. During this flow of current the capacitor 8 is charged toward the polarity illustrated but if a time interval for which the voltage across the capacitor 8 has the polarity reversed from that illustrated is longer than the turn-off time of the thyristors 5 and 6 then the thyristors are turned off resulting in the completion of the turn-off of the thyristor chopper circuit.

When the motor circuit is higher in inductance than the reactor 7 as in chopper circuits commonly employed, an electric charge with the polarity illustrated is accumulated on the capacitor 8 through the motor circuit. Upon the voltage across the capacitor 8 slightly exceeding the source voltage, the diode 10 is forwardly biased whereby the load current is initiated to be commutated through the diode 10. At that time, the capacitor 8 results in the accumulation of a charge with the polarity illustrated equal to the source voltage thereon. Also the thyristor 14 is turned off, while the charge accumulated on the capacitor 8 is maintained due to the presence of the diode 9. Thus the arrangement is ready for the succeeding commutation operation of turning again the main thyristor 5 off.

From the foregoing it will be appreciated that the thyristor chopper circuit effects the ON-OFF control of the load current.

It is now assumed that the arrangement of FIG. 2 is equipped on an electric motor vehicle (not shown) adapted to travel along a business track (not shown) and applied with a single-phase alternating current through the track. Under the assumed condition, the single-phase alternating current from the source terminals A and B is full-wave rectified by the rectifier bridge circuit formed of the four diodes 1, 2, 3 and 4 and then applied across the DC motor 11 along with the direct current from the battery 17 while both currents are controlled in the same manner as above described by the thyristor chopper circuits 5 through 9. That is, the motor 11 is under the power running control in the ON and OFF modes of operation. At the same time, the alternating current from the source terminals A and B is applied across the bridge circuit including the thyristors 12 and 13, and the diodes 14 and 15 and phase-controlled through the cooperation of that bridge circuit with the smoothing reactor 16 serially connected thereto for charging the battery 17.

Figure 3:
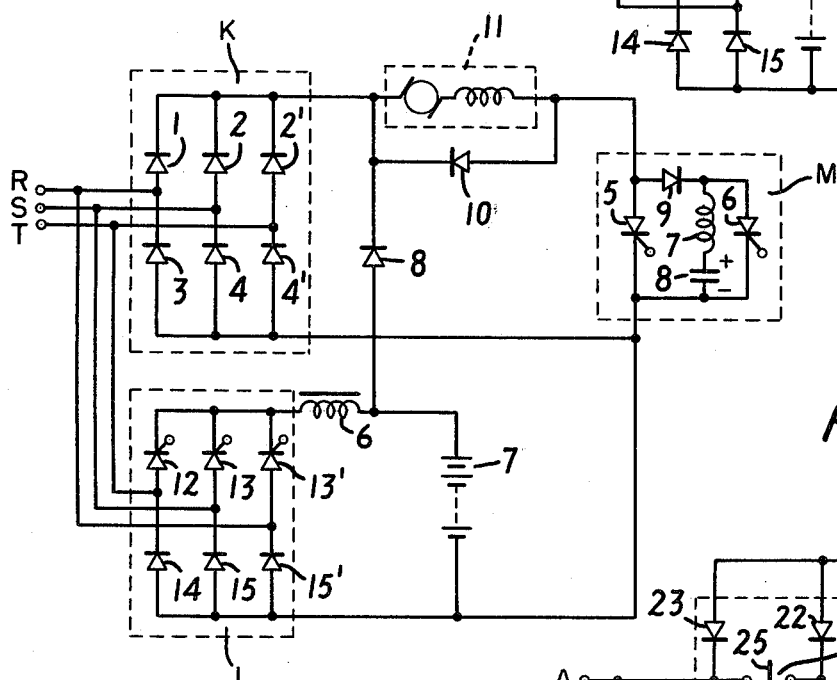
FIG. 3 is a circuit diagram similar to FIG. 1 but illustrating a modification of the arrangement of FIG. 2 suitable for use with a three-phase AC power source.

In order to control three-phase AC powers, the arrangement can be modified as shown in FIG. 3. In FIG. 3, a pair of serially connected semiconductor diodes 20 and 21 are connected across the rectifier bridge circuit as shown in FIG. 2 while a thyristor 22 is connected in series to a semiconductor diode 23 across the bridge circuit shown in FIG. 2 as including the thyristors 12 and 13 and the diodes 14 and 15. Then three source terminals R, S and T are connected to the junctions of the serially connected diodes of the rectifier bridge respectively and also to the junctions of the serially connected thyristors and diodes of the bridge circuit respectively. Only for purposes of illustration the rectifier bridge, the bridge circuit and the thyristor chopper circuit are shown within dotted rectangles K, L and M respectively.

In other respects the arrangement is identical to that shown in FIG. 2. Thus it is identical in operation to the arrangement of FIG. 2 expecting that a three-phase alternating current is full-wave rectified.

In the arrangements as shown in FIGS. 2 and 3, it has been required to use the chopper circuit M for effecting the power running control of the DC motor, and the rectifier bridge circuits L and K providing a power source for driving the load when an AC power source is used as well as the phase control circuit for exclusively charging the battery involved. Further the rectifier bridge circuits L and K should have their current capacities as high as the chopper circuit M. This has resulted in the disadvantage that the construction becomes large-sized enough to be unsuitable for using one electric equipment on electric motor vehicles.

Figure 4:
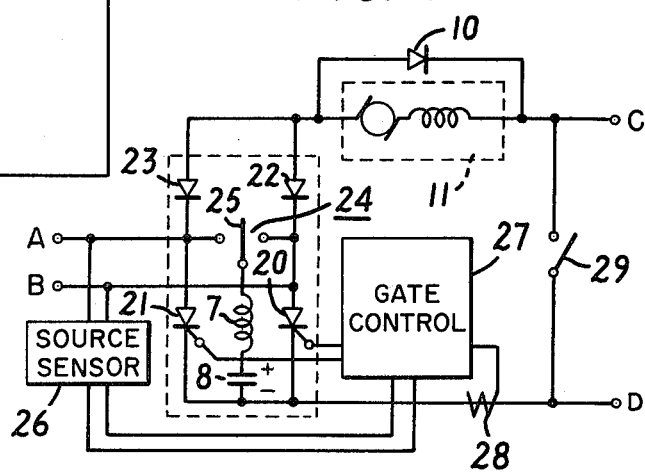
FIG. 4 is a circuit diagram of an AC/DC power source apparatus constructed in accordance with the principles of the present invention.

Referring now to FIG. 4, there is illustrated an AC/DC power source apparatus constructed in accordance with one aspect of the present invention. The arrangement illustrated comprises a pair of AC input terminals A and B adapted to be connected to a single-phase AC power source (not shown), a first thyristor 20 having an anode electrode connected to the input terminal B and a second thyristor 21 having an anode electrode connected to the input terminal A with catode electrodes of both thyristors 20 and 21 interconnected. The anode electrodes of both thyristors 20 and 21 are connected to a DC load shown as a DC motor 11 through respective semiconductor diodes 22 and 23 equal in polarity to the associated thyristors and a semiconductor commutation diode 10 is connected across the DC motor 11. Then both thyristors 20 and 21 can be selectively connected at the anode electrodes to a series combination of a first switching element or a transfer switch 24 including a movable arm 25, a commutation reactor 7 and a commutation capacitor 8 by having a pair of stationary contacts (a) and (b) of the switch 24 connected to the thyristors 21 and 20 at the anode electrodes and therefore to the input terminals A and B respectively.

The input terminals A and B are connected across a source voltage sensor 26 subsequently then connected to a gate control circuit 27 for supplying gating signals to gate electrodes of both thyristors 20 and 21 as will be described later. The gate control circuit 27 includes another input connected to a current detector 28 electrically connected to a lead connecting the cathode electrodes of the thyristors 20 and 21 to a input terminal D subsequently connected to another input terminal C and also to the DC motor 11 through a second switching element shown as a normal open switch 29. The terminals C and D are DC input terminals adapted to be connected to a DC power source (not shown) so that the terminal C becomes positive with respect to the terminal D.

In FIG. 4 it is seen that the thyristors 20 and 21 along with the diodes 22 and 23 form a rectifier bridge circuit including a pair of AC input ends connected to the AC input terminals A and B respectively and a pair of DC output ends having the motor 11 connected thereacross through the second switching element 29.

The voltage sensor 26 is responsive to the presence of an AC voltage power source (not shown) across the input terminals A and B to supply a AC synchronizing signal to the gate control circuit 27 and signal the presence of the AC power source while bringing and maintaining the movable switch arm 25 into and in its neutral position illustrated FIG. 4. In the absence of such an AC power source, the movable arm 25 is in engagement with either one of the stationary contacts (a) and (b) as determined by which of the thyristors 20 and 21 is selected to be used as the main thyristor. With the movable arm 25 engaged by the stationary contact (a) the thyristor 20 is operated as the main thyristor while the thyristor 21 is operated as the auxiliary or commutation thyristor and vice versa.

The gate control circuit 27 is controlled by both the voltage sensor and current detector 26 and 27 respectively to effect the ON-OFF control of the thyristors 20 and 21.

The second switching element 29 is in its open position when the DC input terminals C and D have a DC power source (not shown) connected thereacross and in its closed position when the DC terminals have no DC power source connected thereacross.

Figure 6:
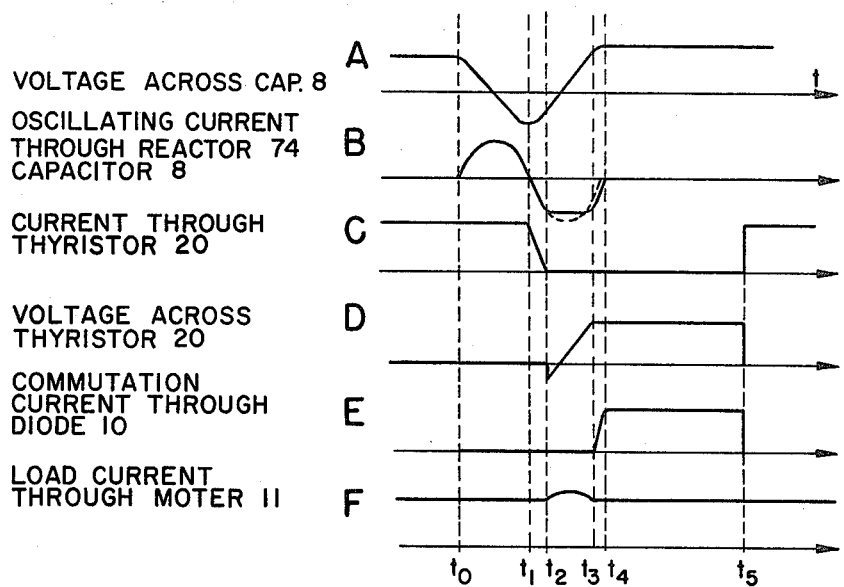
FIG. 6 is a graph illustrating voltage and current waveforms developed at various points in the arrangement shown in FIG. 4.

The operation of the arrangement as shown in FIG. 4 will now be described with reference to FIG. 6. It is now assumed that a DC power source (not shown) is connected across the DC input terminals C and D so that the terminal C is positive with respect to the terminal D and that the transfer switch 24 has the movable arm 25 engaging the stationary contact (a). Also the switch 29 is in its open position illustrated in FIG. 4. It is also assumed that the commutation capacitor 8 has been charged to the source voltage with the polarity illustrated by an auxiliary circuit (not shown) as shown at waveform A in FIG. 6.

Under the assumed condition, a gating signal from the gate control circuit 27 is applied to the first thyristor 20. This causes the firing of the thyristor 20 to initiate a load current to flow through a current path traced from the terminal C through the DC motor 11, the diode 22, the now conducting thyristor 20, the current detector 28 and thence back to the terminal D (see waveform C, FIG. 6). Under these circumstances, it is noted that the charge on the capacitor 8 can not discharge because the diode 22 cooperates with the thyristor 21 in its OFF state to block any current from the capacitor 8. With the load circuit including an inductance, the load current is increased from its null magnitude with time.

Upon the load current increasing to a predetermined magnitude, it is required to turn the thyristor 20 off to attenuate the current. To this end, the gate control circuit 27 applies a gating signal to the second thyristor 21 at time point of $t_o$ (see FIG. 6) to turn it on. This turn-on of the thyristor 21 initiates the charge on the capacitor 8 to pass an oscillating current through a current path traced from the upper end as viewed in FIG. 4 of the capacitor 8 through the reactor 7, the movable arm 25 and the stationary contact (a) of the switch 24, the now conducting thyristor 21 and thence back to the capacitor 8 at the lower end as shown at waveform B in FIG. 6. The oscillating current is caused from an LC resonance developed in that current path. The positive half cycle of the oscillating current decrease, the charge on the capacitor 8 until the latter is charged with the polarity reversed from the preceding polarity at the end of the positive half cycle of the current or at time point of $t_1$. The charge now accumulated on the capacitor 8 is substantially equal in magnitude to the unitial charge thereon.

When the oscillating current enters the negative half cycle thereof, the current tends to flow in the opposite direction through the same current path as in the preceding positive half cycle thereof. At that time, the thyristor 21 receives a reverse voltage from the capacitor 8 to be turned off. Thus the oscillating current flows through another current path traced from the lower end as viewed in FIG. 6 of the capacitor 8 through the current detector 28, the DC motor 11, the diode 23, the stationary contact (a) and movable arm 25 of the switch 24, the reactor 7 and thence back to the capacitor 8 at the upper end. This current increases with time. Assuming that the reactor 7 is designed and constructed to have an inductance far higher than the inductance of the load circuit which is commonly adopted, the magnitude of the load current up to the completion of the commutation of the thyristor 20 will remain substantially unchanged from that before the initiation of the flow of the oscillating current in its negative half cycle. When the oscillating current becomes equal in magnitude to the load current, the current through the thyristor 20 becomes null as shown at waveform C in FIG. 6. That is, at time point of $t_2$ the thyristor 20 reaches a null current and has a reverse voltage applied thereacross as shown at waveform D in FIG. 6.

Thereafter the oscillating current in its negative half cycle is equal in magnitude to the load current and continues to flow with a relatively small change in magnitude with respect to time. Therefore, in the series combination of the thyristor and diode 20 and 21 respectively, the cathode side of the thyristor 20 becomes positive with respect to the anode side of the diode 22. This means that the thyristor 20 is applied with a voltage substantially equal in magnitude to a voltage across the diode 22 so that the two are reversely biased. If the reactor and capacitor 7 and 8 respectively have such predetermined magnitudes that said voltage is applied across the thyristor 20 for a time interval longer than the turn-off time thereof, then the thyristor 20 is turned off within that time interval resulting in the recovery of its ability to withstand the forward voltage. As the capacitor 8 has again charged to about the source voltage with the polarity illustrated resulting from the negative portion of the oscillating current, the voltage across the DC motor 11 disappears. At that time or time point of $t_3$, a commutation current is initiated to flow through the diode 10 due to an electrical energy accumulated on the inductive portion included in the load circuit as shown at waveform E in FIG. 6. Simultaneously the accumulation of an electrical energy on the capacitor 8 is accomplished through the load circuit whereby the last portion of the negative half cyclce of the oscillating current terminates. The load current entirely flows through the diode 10 simultaneously with the completion of the negative half cycle. As soon as the capacitor 8 has been fully charged with the polarity illustrated the oscillation current tends to enter again the next positive half cycle thereof but a flow of current toward the load side is blocked by the diode 23 while a flow of current toward the side of the thyristor 21 is prevented due to the OFF state of the latter caused from the absence of a gating signal thereon. In this way the thyristor 20 has been turned off and the thyristor 21 also turned off to complete the commutation operation at time point of $t_4$.

Thereafter, the gating signal from the gate control circuit 27 is again applied to the thyristor 20 at time point of $t_5$ to repeat the process as above described. Thus the DC motor 11 continues to be in operated in the ON-OFF mode.

It is now assumed that the AC input terminals A and B have an AC power source (not shown) connected thereacross. In this case, the switch 29 connected across the DC terminals C and D is maintained in its closed position and the voltage sensor 16 responds to the presence of the AC power source across the AC terminals A and B to put and maintain the movable switch arm 25 in its neutral position illustrated in FIG. 4 and to inform the gate control circuit 27 of the presence of the AC power source while supplying a synchronizing signal resulting from that AC power source to the gate control circuit 27. The gate control circuit 27 is responsive to the synchronizing signal from the voltage sensor 26 to supply gate signals to the thyristors 20 and 21 to effect the phase control thereof. Under these circumstances, the bridge circuit formed of the thyristors 20 and 21 and the diodes 22 and 23 functions as the main circuit and full-wave rectifies the alternating current in the controlled manner to supply a unidirectional power to the DC motor 11 as well known in the art. Therefore the operation thereof need not be further described herein.

From the foregoing, it will be appreciated that the arrangement of FIG. 4 is effective for supplying a driving power of the DC motor 11 even though either a DC power or an AC power would be applied thereto. It is also seen that the two thyristors used so as to perform the function of a thyristor chopper in the operation by a DC power source can also be utilized as thyristors effecting the phase control in the operation by an AC power source. Further in order to operate also the arrangement of FIG. 4 by an AC power source, it is required only to add a single semiconductor diode thereto as will readily be understood from the comparison with the arrangement shown in FIG. 1. This results in a simple construction.

The present invention as above described has several advantages. For example, if one of the thyristors, for instance, the thyristor 20 has been disabled due to its fault then a gating signal from the gate control circuit 27 can be applied to the other thyristor 21 while only a circuit with the thyristor 20 is maintained in open circuit relatinship. Thereby an oscillating current is caused to flow through the current path including the thyristor 21, the reactor 7 and the capacitor 8. This oscillating current flows through the load circuit in the negative cycle thereof. Since the thyristor 20 fired in the positive half cycle of the oscillating current has been in open circuit relationship, a current can flow through the load current for a short time interval each time the gating signal is applied to the thyristor 21. With the shynchronizing signal increased in frequency, the bridge circuit without the thyristor 21 can be operated as an externally forced commutation chopper circuit with a fixed ON time to continuously supply a current to the DC load while the current is relatively low in magnitude. Thus upon the occurrence of an emergency due to the fault of the thyristor 20 the complete suspension of the operation can be avoided by performing the low speed operation. This is true in the case of any of the semiconductor element would be out of order in the operation by an AC power source. This is because alternate half cycles of an oscillating current can be utilized to perform the operation while the disable semiconductor element is put in open circuit relationship.

While the foregoing description has been made in terms of the movable arm 25 engaged by the stationary contact (a) of the transfer switch 24 the engagement of the movable arm 25 with the other stationary contact (b) permits the same operation as above described except for the exchange of the thyristor 21 and the diode 22 for the thyristor 20 and the diode 21 respectively. It follows that the low speed operation upon the occurrence of an emergency as above described can be performed only by engaging the movable arm 25 engaged by that stationary contact connected to the thyristor side free from a fault.

The second switching element may be of a contactless type by replacing the same by a semiconductor diode so poled that its cathode electrode is connected to the terminal C while its anode electrode is connected to the terminal D.

It is to be noted that with the phase control effected in the presence of an AC power source, the movable switch arm 25 is maintained in its neutral position where the series combination of the reactor and capacitor 7 and 8 respectively has not been connected across the thyristor 20 or 21. One of the reasons for this is that, upon effecting the phase control, it is not desirable to form a current path traced from the AC input terminal A through the movable arm 25 engaged by the stationary contact (a), the reactor 7, the capacitor 8, the current detector 28, the switch 29, the DC motor 11, the diode 22 and the AC terminal B as far as the terminal A is positive with respect to the terminal B. If this current path is formed and if thyristor 20 or 21 continues to be in its OFF state then an electric charge with the polarity illustrated is accumulated on the capacitor 8 until the charge will reach the peak magnitude of the phase voltage of the associated AC power source. At that time no current flows through current path just described and also the current continuing to flow through it has a very low magnitude.

The formation of the abovementioned current path is also undesirable for the following reason: If the charge is present on the capacitor 8 as above described and if an AC voltage is applied across the terminals A and B to render the terminal B positive with respect to the terminal A then the firing of the thyristor 20 requires a gating signal in the form of a rectangular pulse having a broad pulse width. More specifically, when the series combination of the reactor and capacitor 7 and 8 respectively is operated in the chopping mode by a DC power source, the main thyristor should be turned off within a short time interval. This results in the resulting resonance frequency far higher than the commercial frequency generally available. Therefore upon turning the thryslar 20 on, the terminal B is shortcircuited to the terminal A by means of the reactor and capacitor 7 and 8 respectively resulting in a flow of oscillating current having a high frequency. This oscillating current first flows through a current path including the terminal B, the thyristor 20, the capacitor 8, the reactor 7, the stationary switch contact (a) and the terminal A in the named order and after having been inverted in its polarity, the oscillating current tends to flow through the same current path in the opposite direction leading to the turn-off of the thyristor 20. This results in the necessity of applying a gating signal having a broad pulsewidth to the thyristor 20 in order that the latter continues to be in its ON state. In other words, it is possible to operate the arrangement of FIG. 4 with either a direct current or an alternating current while the movable switch arm 25 is in engagement with either one of the stationary contacts (a) and (b) as long as such a pulse broad in pulsewidth is applied to the thyristor 20.

FIGS. 5a, 5b, 5c and 5d show different combinations of the bridge circuit formed of the thyristors 20, 21 and the diodes 22, 23 and the reactor and capacitor 7 and 8 respectively illustrated within dotted reactance in FIG. 4. In FIG. 5a, the thyristors 20 and 21 are disposed on the positive side of the bridge circuit while the diodes 22 and 23 disposed on the negative side thereof. In FIG. 5b thyristors 22' and 23' are substituted for the diodes 22 and 23. In FIG. 5c only one of the diodes is replaced by a thyristor 23'. In FIG. 5d the series combination of the reactor and capacitor 7 and 8 respectively can be selectively connected across either the thyristor 20 or a thyristor 23' substituted for the diode 23 through a double of pole transfer switch 24'. The arrangement of FIG. 5d is operative with an alternating current so that all alternate half cycles of the alternating current may be applied to the load circuit.

The present invention as shown in FIG. 4 is advantageous in that the main and commutation thyristors operative in the chopping mode during the energization by a DC power source can be also be used as thyristors operative in the phase control mode during the energization by an AC power source resulting in a simplified construction having the number of high power elements small as compared with the prior art practice. Also an AC/DC power source system is provided. Further the occurrence of a fault on either one of the thyristors does not lead to the complete suspension of the operation.

Figure 7:
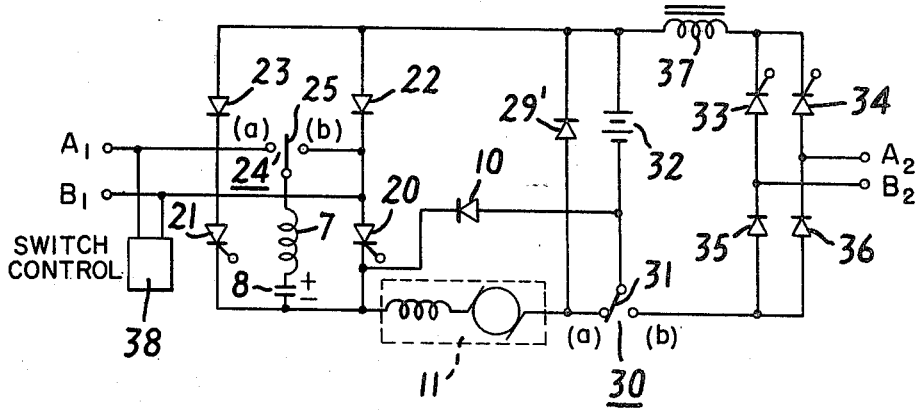
FIG. 7 is a schematic circuit diagram of a modification of the arrangement shown in FIG. 4 wherein there are disposed a battery and means for exclusively charging the battery.

FIG. 7 shows an arrangement similar to that illustrated in FIG. 4 except for the provision of a DC power source or a battery and means for charging the battery. In the arrangement illustrated, the DC motor 11 is connected across the cathode side of the thyristors 20 and 21 and the anode side of the diodes 22 and 23 through a semiconductor diode 29' serving as the switch 20 shown in FIG. 4 and also the through a transfer switch 30 and a DC power source or a first power source shown as aa battery 32. The combination diode 10 is connected across the motor 11 and the transfer switch 30.

The transfer switch 30 includes a movable arm 31 connected to the junction of the negative end of the battery 32 and the diode 10, one stationary contact (a) connected to the DC motor 11 and the other stationary contact (b) connected to one output of another bridge circuit formed of a pair of thyristors 33 and 34 and a pair of semiconductor diodes 35 and 36, that is to say the anode side of the diodes 35 and 36. This bridge circuit has the other output or the cathode side of the thyristors 33 and 34 connected to the positive end of the battery 32 and therefore to the anode side of the diodes 22 and 23 through a smoothing reactor 37. The bridge circuit 33 through 36 also includes a pair of AC inputs connected to a pair of AC input terminals $A_2$ and $B_2$ adapted to be connected to a second power source of the AC type (not shown). This second AC power source is adapted to be connected across AC input terminals $A_1$ and $B_1$ corresponding to the AC input terminals A and B as shown in FIG. 4.

A transfer-switch control circuit 38 rather than the voltage sensor 26 (see FIG. 4) is connected across the AC terminals $A_1$ and $B_1$ to respond to the connection of the second AC power source thereacross to control the position of the movable arm relative to the stationary contacts of each transfer switch 24 or 30. That is, in the presence of a second AC power source (not shown), the switch control circuit 38 is operative to maintain the movable switch arm 25 in its neutral position illustrated in FIG. 7 while engaging the movable arm 31 with the stationary contact (b) of the transfer switch 30. In the absence of the AC power source, the switch control circuit 38 causes the movable arm 25 to engage either one of the stationary contacts (a) and (b) as determined by which of the thyristors 20 and 21 is used as the main thyristor while the movable arm 31 is engaged by the stationary contact (a) of the transfer switch 30.

The diode 29' acts to provide a current path for the DC motor 11 in the presence of a second AC power source (not shown).

In the arrangement of FIG. 7 the remaining portion is identical to the corresponding portion shown in FIG. 4.

The arrangement of FIG. 7 is operated as follows: It is assumed that an electric motor vehicle (not shown) equipped with the arrangement of FIG. 7 is traveling along a road through the operation of the battery 32. Under the assumed condition, the transfer switch 24 has the movable arm 25 engaged by the stationary contact (a) to connect the serially connected reactor and capacitor 7 and 8 respectively across the thyristor 21 and the transfer switch 30 has the movable arm 31 engaged by the stationary contact (a). Thus the arrangement is similar in circuit configuration to that shown in FIG. 4 and having a DC power source connected across the DC terminals C and D thereof. Accordingly the arrangement is operated in the similar manner as above described in conjunction with arrangement having the DC input terminals C and D connected across a DC power source and with reference to FIGS. 4 and 6.

Subsequently, it is assumed that the electric motor vehicle (not shown) is traveling along a business track with an AC power supplied thereto through the track. That is, the arrangement of FIG. 7 has each pair of AC terminals $A_1$ and $A_2$ or $A_2$ and $B_2$ connected across a second AC power source (not shown). The transfer switch control circuit 38 senses the AC power source connected across the AC terminals $A_1$ and $B_1$ to bring and maintain the movable switch arm 25 into and in its neutral position and to engage the movable arm 31 with the stationary contact (b) of the transfer switch 30. Therefore it is seen that the arrangement of FIG. 7 performs the same operation as the arrangement of FIG. 4 having an alternating current applied across the AC terminals A and B as above described in conjunction with FIG. 4.

In addition, the AC power source (not shown) connected across the AC terminals $A_2$ and $B_2$ is utilized to exclusively charge the battery 32 through the bridge circuit including the thyristors 33, 34 and the diodes 35 and 36. More specifically, an alternating current from the AC terminals $A_2$ and $B_2$ is rectified by the bridge circuit 33-34-35-36 operated in the phase control mode and the rectified current flows through the smoothing reactor 37 where it is smoothed and thence Voa the battery 32 and the movable arm 31 and the stationary contact (b) of the transfer switch 30 to exclusively charge the battery 32. Therefore during the travel along the track, the battery 32 is charged separately from and simultaneously with the control of the DC motor 11 effected by the bridge circuit 20-21-22-23.

The arrangement of FIG. 7 will now be described in terms of the regenerative mode. With the arrangement operated with a direct current from the battery 32, the DC motor 11 has its field or its rotor inverted in polarity while the movable arm 31 is engaged by the stationary contact (b) of the transfer switch 30. Then the main thyristor 20 is turned on to permit a flow of current through the DC motor 11 and the now conducting thyristor 20. When the current increases to a predetermined magnitude as a result of the DC motor 11 acting as a generator, the other thyristor 21 is fired to turn the thyristor 20 off. In the OFF state of the thyristor 20 the current flows through a closed loop traced from the DC motor 11 through the diode 29', the battery 32, the diode 10 and thence back to the DC motor to regenerate the battery 32. After the attenuation of the current, the thyristor 20 is again turned on to repeat the process as above described. This results in the regenerative mode of operation.

During the travel along the track the DC motor 8 has its field or its rotor inverted in polarity while a switch (not shown), for example, is used to prevent the AC power source connected across the AC terminals $A_1$ and $B_1$ from providing an input to the bridge circuit for controlling the DC motor 11. Further the engagement of the movable arm 25 with the stationary contact (a) of the transfer switch 24 yields a circuit configuration equivalent to that formed in the regenerative mode of operation during the travel utilizing the battery 32. Therefore by turning the thyristor 20 on and off, it becomes possible to regenerate the battery 32 through a closed loop similar to that above described in conjunction with the OFF state of the thyristor 20.

The arrangement of FIG. 7 has, in addition to the advantages as above described in conjunction with FIG. 4, the other advantages. For example, the battery is long in useful life time and the bridge circuit for charging the battery can be formed of small-sized elements resulting in a decrease in overall dimension of the device. This is because the battery 32 is exclusively charged with a constant current through the phase control of the bridge circuit including the thyristor 33 and 34 and the diodes 35 and 36.

In contrast, the arrangements as shown in FIGS. 2 and 3 have included the chopper circuit operated in the ON and OFF modes to control the DC motor so that the battery relatively frequently repeat its charging and discharging resulting in a short life time.

Further since the rectifier for exclusively charging the battery disengages from the main control circuit during the travel along a business track, the removal of the particular AC input due to for example the disengagement from an associated aerial line has led to a failure in commutation. In the arrangement of FIG. 7, however, the DC motor is controlled by the thyristors 20 and 21 of the bridge circuit operated in the phase control mode during the travel along a track. Thus there is no fear that the commutation will fail due to the disengagement from the aereal line or the like and the commutation is spontaneously effected.

While the present invention has been illustrated and described in terms of the single-phase AC power source it is to be understood that the same is equally applicable to the three-phase AC power source.

FIGS. 8a and 8b show two different modifications of the bridge circuit for controlling the DC motor for use with a three-phase AC source. In FIGS. 8a the bridge circuit for controlling the DC motor has connected thereacross a series combination of a thyristor 40 and a semiconductor diode 41 and an additional AC input terminal R is connected to the junction of the thyristor and diode 40 and 41 respectively. The remaining AC input terminals S and T correspond to the terminals A and B as shown in FIG. 4 or 7.

An arrangement shown in FIG. 8b is different from that illustrated only in that the series combination of transfer switch 24, reactor 7 and capacitor 8 is connected to the anode side of the thyristors 20, 21 and 40 and thyristors 22', 23' and 41' are substituted for the diodes 22, 23 and 41.

When operated, as a chopper with the battery, the arrangement as shown in each of FIGS. 8a and 8b includes the two thyristors corresponding to the main thyristor. Therefore either or both the thyristors may be used as the main, while the remaining one performs the function of commutation. This increases the flexibility as to the use of the thyristors. Therefore the arrangements as shown in FIGS. 8a and 8b have, in addition to the advantages as above described, the advantage that, with that thyristor for one phase failing to be operated, the thyristors for the remaining phases can be used to perform the normal operation of the thyristor chopper circuit during the travel along the road through the operation of the battery while during the travel due to the track source, the thyristors can be operated under the phase control mode though one phase is disabled.

FIG. 9 shows another modification of the present invention wherein the bridge circuit for controlling the DC motor also serves to charge the battery. The motor control bridge circuit simitor to that shown in FIG. 4 has connected thereacross both a series combination of the DC motor 11 and thyristor 42 with the polarity illustrated and another series combination of the battery 32 and a separate thyristor 43 with the polarity illustrated through a reactor 44 and the transfer switch 30. The thyristors 42 and 43 effect the phase control of the DC motor 11 and the battery 32 respectively. The transfer switch 30 includes its movable arm 31 connected to the cathode side of the thyristors 20 and 21 and a pair of stationary contacts (a) and (b) connected to the junction of the battery 32 and the thyristor 43 and to the reactor 44 respectively. As in the preceeding arrangements, the commutation diode 10 is connected across the motor 11.

The operation of the arrangement as shown in FIG. 10 will now be described in conjunction with the motor 11 driven by the battery 32. In this case, the transfer switch 30 has the movable arm 31 engaged by the stationary contact (a) while the transfer switch 24 has the movable arm 25 engaged by either one of the stationary contacts or the stationary contact (a). Therefore the thyristor 20 acts as the main thyristor while the thyristor 21 acts as the commutation thyristor.

Also it is assumed that the capacitor 8 has charged with the polarity illustrated through a current path traced from the battery 32, through the motor 10, the conducting thyristor 42, the diode 23, the stationary contact (a) and movable arm 25 of the transfer switch 24, the reactor 7, the capacitor 8 and thence to the battery 32.

Figure 5:
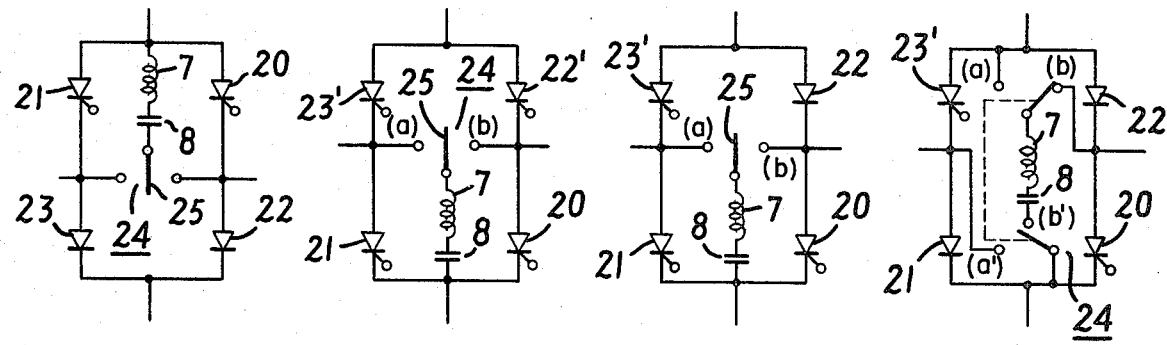
FIGS. 5a, 5b, 5c and 5d are circuit diagrams of different modifications of the essential portion of the arrangement shown in FIG. 4.

When a gating signal is applied to the main thyristor 20 to turn it on, a load current from the battery 32 flows through the DC motor 11, the conducting thyristor 42, the diode 22, the now conducting thyristor 20, and the movable arm 31 and stationary contact (a) of the transfer switch 30. Thereafter the process as above described in conjunction with FIGS. 4 and 5 is repeated. That is, by alternately applying gating signals to the main and commutation thyristors 20 and 21 respectively, the load current is intermittently passed through the DC motor 11 thereby to control the power supply to the motor.

Where a single-phase AC power source on an associated track is utilized to charge the battery 32 and to drive the DC motor 11, the movable switch arm 25 is in its neutral position illustrated in FIG. 9 and the transfer switch 30 have the movable arm 31 engaged by the stationary contact (b) while the AC power source (not shown) is connected across the AC terminals A and B. Under these circumstances, the transfer switch 24 has the movable arm 25 maintained in its neutral position illustrated in FIG. 9 while the transfer switch 30 has the movable arm 31 engaged by the stationary contact (b) to permit both a current from the battery 32 and current through the motor 11 to flow through the reactor 44. The bridge circuit including the thyristors 20 and 21 and the diodes 22 and 23 is operative, in addition to the control of the power supply to the motor 11, to full-wave rectify an alternating current through the AC terminals A and B. The operation will now be described in conjunction with FIG. 10, wherein waveform A describes the relationship between the full-wave rectified voltage and the ON state of the thyristors 42, 43 and 20 or 21 and the voltage across the battery 32 in the high speed operation.

At time point of $t_o$ a rectified voltage begins to increase from its null magnitude, and at time point of $t_1$ a gating signal is applied to the thyristor 42 assumed, in this case, to be larger in conduction angle than the thyristor 43 to turn it on while at the same time a gating signal is applied to the thyristor 20 and/or the thyristor 21 to turn it or them on. That is, the main thyristor 20 or 21 as the case may be is entered in the ON state shown by the hatched portion 45 in FIG. 10. It is noted that the thyristor 20 and/or the thyristor 21 are or is applied with a gating signal simultaneously with the application of a gating signal to which of the thyristors 42 and 43 has a larger conduction angle. The conduction of the thyristor 42 causes a flow of current $i_L$ through the reactor 44 (see waveform B, FIG. 10) while increasing a load current $i_m$ flowing through the motor 11 (see waveform D, FIG. 4).

Then at the time point of $t_2$ the thyristor 43 is turned on to enter its ON state shown by the crosshatched portion 46 in FIG. 10. Thus a charging current $i_c$ for the battery 32 is initiated to flow through the battery 32 (see waveform C, FIG. 10) while the current $i_L$ flowing through the reactor 44 abruptly increases as shown at waveform B in FIG. 10. At time of $t_3$ the source voltage is equal to the voltage across the battery 32 as shown at horizontal dotted line 47 in FIG. 10 after which the charging current $i_c$ is decreases (see waveform C, FIG. 10). At time point of $t_4$ one half cycle of the source voltage terminates but the thyristor 43 has the current from the battery 32 still flowing therethrough whereby the load current $i_M$ continues to flow through the DC motor 11 (see waveform D, FIG. 10).

Upon the charging current $i_c$ reaching its null magnitude, the thyristor 43 is turned off to remove the applied voltage from the motor 11. Thus the load current $i_M$ is decreased as shown at waveform D in FIG. 10 until the one half cycle of the system terminates at time point of $t_3$ followed by the next half cycle.

While the description has been made on the assumption that the thyristor 43 is larger in conduction angle than that the thyristor 44 it is to be understood that it is equally applicable to the case of the thyristor 44 has a larger conduction angle than the thrystor 43.

From the foregoing it is appreciated that a conduction angle or a firing phase angle of a thyristor for the charging current can not be larger than that for the load current. However, this does not provide any objection upon practicing the present invention. More specifically, in electric motor vehicles having the chopping and phase control modes of operation as above described, the battery is charged during the travel along the track having a predetermined length. In the low speed operation in which the thyristors are fired at small phase angles, it is possible to increase a time interval for which the motor vehicle travels along the associated track so that the battery can accumulate a sufficiently high power. This is because the battery is charged for a long time interval inspite of a low charging current. On the other hand, the high speed operation causes a decrease in time interval of travel along the track but simultaneously the firing phase angle can be increased with the result that the battery is permitted to be charged with a high current and therefore can accumulate a sufficiently high power thereon.

It has been accepted opinion that the battery can increase in life time by soley charging the same during the charging time and solely discharging it during the discharging time. Also it has been another accepted opinion that, although relatively high currents are drawn from the battery, it is desirable to charge the battery with a constant current less than the discharging currents upon charging it and that is is undesirable to repeatedly charge and discharge the battery within a short time interval. In the conventional arrangement of FIG. 2, the battery 17 is electrically connect across an AC power source (not shown). Also another conventional arrangement as shown in FIG. 3 may be modified to control an electric power from the particular AC power source by the bridge circuit L alone to operate the battery in its floating state with the bridge circuit K omitted. However the battery can not be charged within a constant current and is forced to be repeatedly charged and discharged at a high frequency. That is to say, even though the battery is put in the phase control mode of operation in order to charge the same with a constant current, the battery will be discharge provided that a high current should flow through the motor circuit to start the DC motor. If a current through the motor is higher than a charging current through the battery then the battery is required to supply a power to the motor circuit during a time interval that the full-wave rectified voltage is less than the voltage across the battery. This results in the discharging of the battery. Thus the battery is forced to be repeatedly charged and discharged resulting in a descrease in lifetime and in a charge in charging current. The reasons for which the battery is connected in parallel to the AC power source is that, upon the disappearance of the AC power source caused from the disengagement of a current collector involved from an associated aereal line, the chopper becomes disabled.

In the arrangement of FIG. 9, the disadvantages of the prior art practice as above described are eliminated ensuring that any excessive burden is prevented from being imposed upon the battery. This is because the phase control is effect in the presence of an AC power source.

If the thyristor 20 or 21 or the diode 22 or 23 is disabled for some reason then the half-wave rectification can be utilized for traveling and chaging purposes in the phase control mode. In the operation by the battery, the movable arm 25 of the transfer switch 24 is required only to engage that stationary contact connected to the circuit portion free from the fault. That thyristor connected in the circuit portion free from the fault cooperates with the commutation reactor and capacitor to be operated as an externally forced chopper with a fixed ON time to permit the travel of the associated motor vehicle at a low speed thereby to eliminate the interference with other vehicles.

From the foregoing it is seen that the chopper circuit operated during the travel by the battery can be also used as a charging circuit during the recept of an alternating current and that one thyristor is connected in each of the circuits with the motor and battery. Therefore the resulting device is simplified in construction to be suitable for use as an electric equipment on an electric motor vehicle. Further the battery is possible to be exclusively charged and a fault of some of the elements does not lead to a disabled vehicle which less affects other motor vehicles.

While the arrangement of FIG. 9 has been illustrated and described in terms of the single-phase AC power source it is to be understood that at may be operated by a three-phase AC power source. In that case, any pair of phase lines of the three-phase source may be utilized. Alternatively the arrangement may be modified to include the arrangement such as shown in FIG. 8a or 8b.

In order to simplify the arrangement of FIG. 9, the thyristor 42 can be omitted as shown in FIG. 11. It will readily be understood that the arrangement of FIG. 11 is identical in both operation and results to that shown in FIG. 9.

FIG. 12 shows a different modification of the present invention suitable for use with a three-phase AC power source. The arrangement illustrated comprises three AC input terminals R, S and T, three series combinations of thyristors and semiconductor diodes 40 and 41, 20 and 22 and 21 and 23 respectively interconnected in parallel and three thyristors 50, 51 and 52 including anode electrodes connected together to one another and chathodes electrodes connected to the AC terminals R, S and T respectively. The junction of the thyristor and diode 40 and 41 is connected to the AC terminal R, and the junction of the thyristor and diode 20 and 22 respectively is connected to the AC terminal S. Similarly the junction of the thyristor and diode 21 and 23 respectively is connected to the AC terminal T.

The thyristors 20, 21 and 40 and the diodes 22, 23 and 42 form a rectifier bridge circuit P corresponding to the bridge circuit K as shown in FIG. 3 while the thyristors 50, 51 and 52 and the diodes 22, 23 and 41 form a rectifier bridge circuit Q corresponding to charging rectifier bridge circuit L as shown in FIG. 3, and serving to exclusively charging a battery. It is to be noted that both rectifier bridge circuits P and Q include the common diodes 22, 23 and 41.

The arrangement further comprises a series combination of a commutation capacitor S and a commutation reactor 7 adapted to be connected across the thyristor 40 through a switch 24' serially connected to the series combination 7–8 to form a commutation circuit with the thyristor 40. The commutation circuit corresponds to the commutation circuit M as shown in FIG. 3. In FIG. 12 the series combination 7–8 and the switch 24' are illustrated within dotted rectangle N and the switch 24' is shown as being in its closed position. The switch 24' is in its open position as long as the arrangement is operated by a three-phase AC source (not shown) adapted connected to the AC input terminals R, S and T.

Serially connected across the rectifier bridge circuit P are a DC motor 11, a regenerative switch 53, a battery 32 and a travel-by-battery switch 54 in the named order. The regenerative switch 53 is in its open position only in the regenerative mode of operation. The travel-by-battery switch 54 is also connected across the charging bridge circuit Q through a reactor 55 and adapted to be put in its open position during the charging of the battery 32. A commutation diode 10 is connected across the serially connected motor and switch 11 and 53 respectively and a semiconductor diode 29 is connected between cathode side of the rectifier diodes 22, 23 and 41 and the junction of the motor and switch 11 and 53 respectively.

The operation of arrangement as shown in FIG. 12 will now be described. Assuming that the DC motor is driven only by the battery 32, the switches 24', 53 and 54 are put in their closed position. It is also assumed that the capacitor 8 has been preliminarily charged to about a source voltage with the polarity illustrated. Namely that side of the capacitor 8 connected to the anode side of the thyristors 20, 21 and 40 has been positive with respect to the opposite side thereof. Then a gating signal is applied to the thyristor 20 to turn it on. This turn-on of the thyristor 24 cause a flow of current through a current path traced from the positive side of the battery 32, through closed switch 53, the DC motor 11, the now conducting thyristor 20, the diode 22, the closed switch 54 and thence to the battery 32 on the negative side to drive the motor 11. An inductance included in the circuit with the motor 11 acts to increase the current with time. If it is desired attenuate that current then a gating signal can be applied to the thyristor 40 to turn it on. This causes the thyristor 20 to be turned off while at the same time thyristor 40 is turned off in the similar manner as above described in conjunction with the thyristor chopper as shown in FIG. 2. Therefore the capacitor 8 is again charged to about the source voltage with the polarity illustrated. The arrangement of FIG. 12 is now ready for the succeeding operation.

In the arrangement of FIG. 12, the thyristors 40 and 20, and the diodes 41 and 22 along with the reactor 7 and the capacitor 8 form a circuit identical in operation to the thyristor chopper M as shown in FIG. 3 as will readily be understood from the following substitutions of circuit elements: The series combination of the thyristor and diode 20 and 22 respectively for the main thyristor 5, the thyristor 40 for the commutation thyristor 6, the reactor and capacitor 7 and 8 respectively for the auxiliary commutation circuit of the reactor and capacitor 7 and 8, and diode 41 for the diode 9. The elemtns before "for"]are included in the arrangement of FIG. 12 and the elements after for are shown in FIG. 3. (in FIG. 3 the diode 9 may change from its position illustrated to its position where it is disposed between the cathode electrode of the thyristor 5 and the capacitor 8 with its cathode electrode connected to the thyristor 5).

As previously described, an electrical energy accumulated on the inductance included in the circuit with the motor 11 is commutated through the diode 10 in the OFF mode of operation to form a commutation current.

With the arrangement operated by an AC track power source (not shown), the switches 24' and 54 are put in their open position and the AC track power source is connected to the AC terminals R, S and T. The DC motor 11 is driven under the phase control effected by the rectifier bridge circuit P. This phase control is well known in the art and does not form a part of the present invention. Therefore the phase control need not be described herein.

The rectifier bridge circuit P supplies a load current to the DC motor 11 through the diode 29' while the charging rectifier bridge circuit Q supplies a charging current to the battery 32 through the diode 23, the closed switch 53, and the reactor 55 and under the phase control well known in the art as in the control of the motor 11.

Thus the rectifier bridge circuit P including the thyristors 20, 21 and 40 and the diodes 21, 23 and 83 is operated in the phase control mode when the motor is driven by the AC power source (not shown) and also performs the function of a chopper along with the thyristors performing the rectifying operation and by utilizing the function of the auxiliary commutation circuit N including the reactor and capacitor 7 and 8 when the DC motor is driven by the battery. This results in a simple construction capable of controlling the DC motor driven with either of direct and alternating currents. Further the bridge circuit Q for charging the battery 32 includes the diodes 22, 23 and 41 that are also employed to drive the motor 11 resulting in a further simplification of the construction.

In the regenerative braking mode of operation the DC motor 11 has its field or its rotor inverted in polarity while the switch 54 is put in its closed position and the switch 53 put in its open positin. With the AC source, if present, turned off, the thyristor 20 is fired to cause a flow of current through a closed loop traced from the DC motor 11 through the now conducting thyristor 20, the diode 22, the diode 29 and thence back to the DC motor. Then the motor 11 is driven with the particular externally mechanical torque to act as a generator. Thus the current is initiated to increase and a braking torque begins to be applied to the motor 11.

Upon this current increasing to a suitable magnitude, the thyristor 40 is turned on to turn the thyristor 20 off thereby turning the chopper circuit off. The current flows through a current path traced from the DC motor 11 through the diode 10, the battery 32, the reactor 55, a conducting one of the thyristors 50, 51 and 52, that diode 22, 23 or 41 connected to the conducting thyristor, the diode 29' and thence back to the DC motor to regenerate the battery 32 while attenuating the current. Thereafter the thyristor 24 is turned on to increase the current. Then the process as above described is repeated to operate the chopper circuit in the ON and OFF modes. Thus the braking current is continuously produced from the DC motor 11 to regenerate the battery 32. Regarding the reference to a conducting one of the thyristors, it be understood that a selected one of the thyristors 50, 51 and 52 may be applied with a gating signal in synchronization with the application of a gating signal to the thyristor 40.

While the series combination of the reactor and capacitor 7 and 8 respectively has been connected across the thyristor 40, it may be connected across any one of the thyristors 20, 21 and 40. In the latter case that thyristor connected across the serially connected reactor and capacitor 7 and 8 respectively is used as the auxiliary commutation thyristor in the chopping mode of operation. Also the series combination of the reactor and capacitor 7 and 8 respectively may be connected across any of thyristors substituted for the diodes 22, 23 and 41 with the chopping operation retained.

With the bridge circuit formed of three parallel branches each including a pair of serially connected thyristors, it is required to simultaneously apply gating signals to the two serially connected thyristors.

The charging thyristors 50, 51 and 52 may be low in current capacity because a constant current with a relatively low magnitude is required only to flow through each thyristors.

From the foregoing it will be appreciated that the chopper circuit operative during the travel by the battery to control the DC motor, the control circuit operative by an AC track power source to effect the phase control and one portion of the phase control circuit for charging the battery include common elements resulting in the simplified construction suitable for use as an electric equipment on an electric motor vehicle. Also upon charging the battery, only a charging current with a constant magnitude flows into the battery without a discharge.

Further with the DC motor driven by an AC track power source, the control of the motor can be transferred from the chopper to the thyristors included in the bridge circuit and operated in the phase control mode by putting the switch 24' in its open position to disconnected the reactor and capacitor 7 and 8 respectively from the rectifier bridge circuit. This ensure the stable control without the control disabled, for example, upon the disengagement of a current collector involved from an associated aerial line. The occurrence of a fault on one of the thyristors or one of the diodes does not lead to an associated motor vehicle being disabled as above described in conjunction with FIG. 9. For example, if the thyristor 20 is shortcircuited then the quite normal operation can be performed by operating the thyristor 21 as the main thyristor and putting the thyristor 24 in the open circuit relationship. Alternatively upon the occurrence of a shortcircuit or an open-circuit fault on the thyristor 40, the series combination of the reactor 7 and the capacitor 8 may be connected across the thyristor 20 or 21 with the thyristor 40 put in the open circuit relationship. With both thyristors 20 and 21 failed, those thyristors are put in the open circuit relationship while the remaining thyristor 40 is continuously applied with gating signals having a fixed pulse repetition period. Then the thyristor 40 is operated as an externally forced commutation chopper with the aid of the reactor and capacitor 7 and 8 respectively. Thus the associated vehicle can continue to travel though its speed is very low.

The arrangement of FIG. 12 is equally operative by a single-phase AC source.

Figure 13:
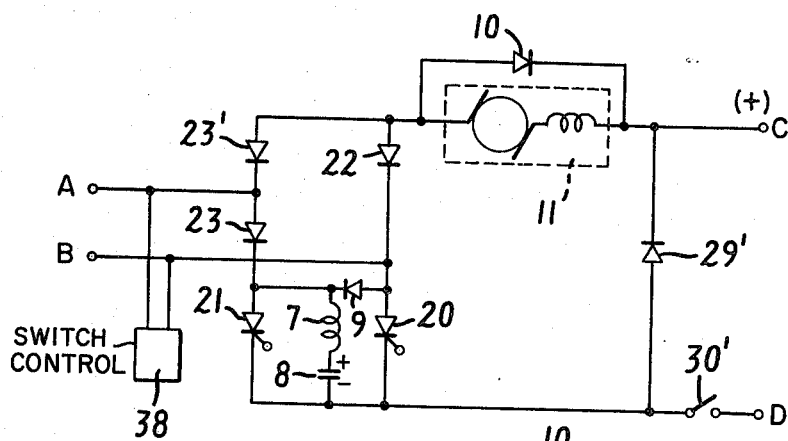
FIG. 13 is a schematic circuit diagram of a modification of the present invention.

FIG. 13 shows a further modification of the present invention. The arrangement illustrated a first series combination of thyristor 20 and a semiconductor diode 22, a second series combination of a thyristor 21 and a pair of semiconductor diodes 23 and 23' and a third series combination of a reactor 7 and a capacitor forming ann auxiliary commutation circuit. The first and second series combination form a rectifier bridge circuit, and the third series combination is connected across the thyristor 21 and also across the thyristor 20 through a semiconductor diode 9 serving to supply a commutation energy to the capacitor 8. A DC load shown as a DC motor 11 is connected between the anode side of the diodes 22 and 23' and the cathode side of the thyristors 20 and 21 through a switch, in this case, a semiconductor diode 29'. A commutation diode 10 is connected across the DC motor 11.

A pair of DC input terminals C and D are connected to the DC motor 11 with the terminal D connected to the cathode side of the thyristor 20 and 21 through a switch 30'. The input terminals C and D are adapted to be connected across a first electric power source of the DC type (not shown) so that the terminal C is positive with respect to the terminal D. Another pair of AC input terminals A and B are connected to the junction of the diodes 23 and 23' and the junction of the thyristor and diode 20 and 22 respectively and adapted to be connected across a second power source of either the AC type or the DC type (not shown). With the second power source of the DC type connected across the terminals A and B, the terminal B is positive with respect to the terminal A. A switch control circuit 38 is connected across the terminals A and B to respond the presence of the second power source across the terminals A and B to put the switch 30' in its open position. With the arrangement driven by the second power source, the diode 29' provides a current path for a current from the bridge circuit.

When a battery (not shown) is connected across the first pair of input terminals C and D while a power source (not shown) is not connected across the second pair of input terminals A and B, the switch control circuit 38 has been operated to put the switch 30' in its closed position. Under these circumstances, the arrangement of FIG. 13 is substantially identical in circuit configuration to that shown in FIG. 4 and having the DC terminals C and D connected across a DC power source (not shown) in FIG. 4) and the tiansfer switch 24 having the movable arm 25 engaged by the stationary contact (a). This is because the diode 9 electrically isolates an electric charge with the polarity illustrated accumulated on the capacitor 8 from the side of the thyristor 20. Therefore the arrangement is similar in operation to that shown in FIG. 4.

On the other hand, when an AC power source (not shown) is connected across the terminals A and B with the terminals C and D maintained in the open circuit, the switch 30' is brought into its open position. In that case, the arrangement performs the substantially similar operation as above described in conjunction with the arrangement of FIG. 4 having the input terminals A and B connected across an AC power source (not shown in FIG. 4). It is noted that due to the serially connected reactor and capacitor 7 and 8 respectively being always connected across the thyristor 21, a gating signal with a relatively long duration should be applied to the thyristor 21 as previously described in conjunction with FIG. 4.

When a DC power source (not shown) is connected across the terminals A and B so as to render the terminal B positive with respect to the terminal A without a DC source connected across the terminals C and D, the switch control circuit 38 is operated also to bring the switch 30' in its open position. Therefore the arrangement is operated as above described in conjunction with the connection of the DC power source across the terminals C and D. That is, the thyristor 20 and 21 are repeatedly turned on and off to put a power supply to the motor 11 under the chopping control. The diode 9 serves to block a direct current from the terminal B.

It is now assumed that with a DC power source (not shown) connected across the terminals C and D to operate the thyristors 20 and 21 in the chopping control mode, an AC source (not shown) is connected across the terminals A and B to bring the switch 30' into its open position. Before the switch 30' is brought into its open position after the AC power source has been connected across the terminals A and B, a dc voltage from the terminals C and D is under the chopping control due to the ON-OFF operation of the thyristor 20. An AC voltage from the terminals A and B is phase-controlled by means of the thyristor 20. Therefore the DC motor 11 is transiently applied with the sum of the chopped DC voltage and the phase-controlled, rectified voltage until the switch 30' is opened. After the opening of the switch 30', the DC motor is properly put in the proper phase control.

From the foregoing it will be appreciated that the arrangement of FIG. 13 is operative with either a DC power source or an AC power source while either alternating or direct current can be supplied to the terminals A and B. Also it is seen that, as in the arrangements above described, a pair of thyristors performing the function of the thyristor chopper in the operation by a DC power source can also be left to attain the purpose of phase control required for the operation by an AC power source. This results in a decrease in the number of high power elements and therefore in the simplication of the resulting device.

The arrangement of FIGS. 13, has further the advantages. For example, with any element such as the thyristor 20 disabled in the operation, by an DC power source, the operation can continue to be performed by disconnecting the disabled thyristor from the bridge circuit, as above described in conjunction with FIG. 12.

Briefly, the disabled thyristor 20 is put in open circuit relationship, the thyristor 21 can be applied with gating signals higher in pulse repetition frequency.

If desired, the diodes 23, 23', 22 and Q may be singly or fully replaced by thyristors except for the commutation diode 10. This measure provides the control excellent in transient response.

Figure 14:
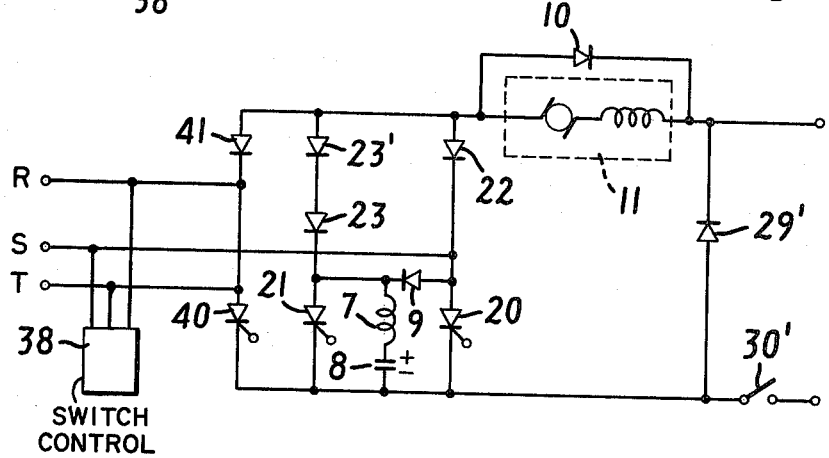
FIG. 14 is a circuit diagram of a modification of the arrangement shown in FIG. 13 and suitable for use with a three-phase AC power source.

FIG. 14 shows a modification of the arrangement shown in FIG. 13 suitable for use with a three-phase AC power source. The arrangement is different from that shown in FIG. 13 only in that in FIG. 14 one of three-phase terminals R, S and T, or the terminal R is connected to the junction of serially connected thyristor and diode 40 and 41 respectively connected across a bridge circuit similar to that shown in FIG. 13.

The arrangement is similar in operation to that shown in FIG. 13 except for the driving by a three-phase source and has the advantages as above described in conjunction with FIG. 12 over the arrangement of FIG. 13.

Figure 15:
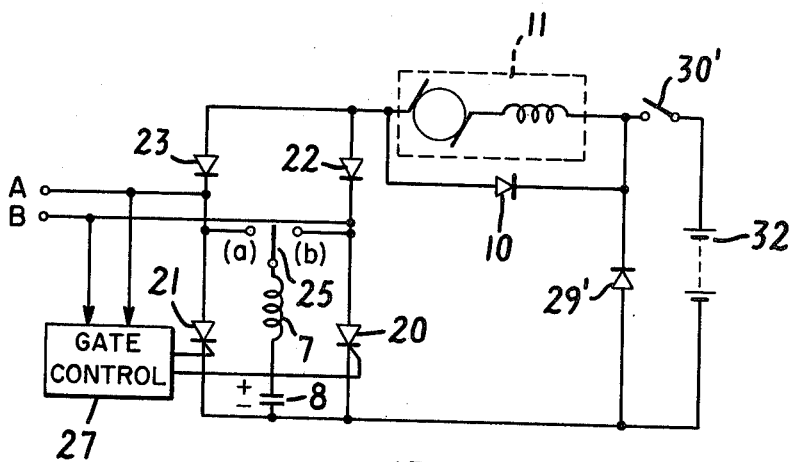
FIG. 15 is a schematic circuit diagram of a modification of the arrangement shown in FIG. 9.

An arrangement as shown in FIG. 15 substantially similar to that shown in FIG. 9 except for the following respects: A gate control circuit 27 is connected across a pair of AC terminals A and B and the DC motor 11 connected across the commutation diode 10 is connected across the series combination of thyristor and diode 20 and 22 respectively through the switch 30'' and the battery 32 and also through the switch shown as the semiconductor diode 29'. The thyristors 42 and 43 and the reactor 44 as shown in FIG. 9 are omitted.

Thus it will readily be understood that the arrangement of FIG. 15 is substantially similar in operation to that shown in FIG. 9.

However it has been found that it is required to change the duration or a pulsewidth of a gating signal applied to each of the thyristors 20 and 21 is preferably changed in the phase control mode of operation from in the copping control mode for the following reasons: In the phase control mode of operation there is the tendency to pass a load current at a relatively low voltage through the DC motor for a power source at a low voltage because the DC motor 11 is inductive. Therefore the current become long in rise time as compared with the chopping control under which the switching is effected with a relatively high voltage having a constant magnitude. This means that the gating signal should continue to be applied to the associated thyristor until the load current exceeds the holding current of that thyristor. As a result, the gating signal is required to have its pulsewidth or duration equal to or larger than 1 millisecond for example.

On the other hand, the commutation reactor and capacitor 7 and 8 respectively are generally selected to be of a time constant at resonance as small as possible in order to broaden a range of chopping control. Thus the resulting resonance of frequency becomes higher. Therefore with the gating signal broad in pulsewidth, the gating signal may continue to be applied to the thyristor 21 even upon the completion of the commutation of the thyristor 20 and accordingly upon the completion of the charging on the capacitor 8 with the polarity illustrated. This permits the load current to continue to flow through the thyristor 21 so that the load current can not be interrupted. In order to avoid this objection, it is required to control the pulsewidth of the gating signal to a low magnitude corresponding to one cycle of the resonance frequency, for example, to about 100 microseconds.

Figure 16:
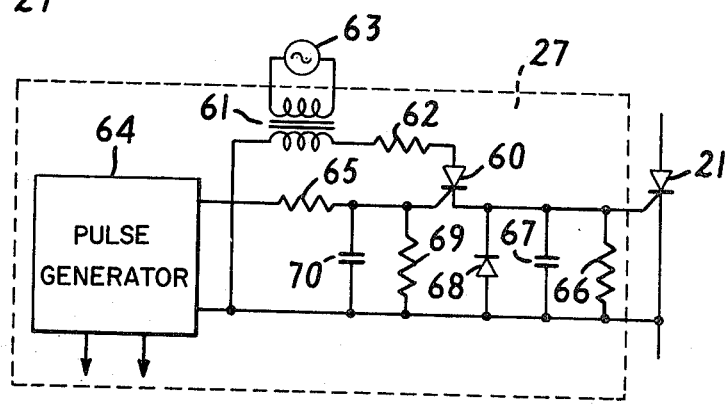
FIG. 16 is a circuit diagram of the gate control circuit shown in FIG. 15.

FIG. 16 shows one form of the gate control circuit 27 meeting the requirements as above described. As shown in FIG. 16, the thyristor 21 has a gate electrode connected to a cathode electrode of a thyristor 60 for producing a gating signal which is, in turn connected at the anode electrode to a transformer 61 for providing a synchronizing signal through a current limiting resistor 62. The transformer 61 has its primary widing connected across an AC power source 63 adapted to be also connected across the terminals A and B (see FIG. 15), and its secondary winding connected to one output of a pulse generator 64 and also to the cathode electrode of the thyristor 21. The pulse generator 64 includes the other output connected to the gate electrode of the thyristor 60 through a current limiting resistor 65. Connected between the gate electrode of the thyristor 21 and the one output of the pulse generator 64 are connected a resistor 66, a capacitor 67 and a semiconductor diode 68 in parallel circuit relationship. Also a resistor 69 and a capacitor 70 are connected across the gate electrode of the thyristor 60 and the one output of the pulse generator 64.

The capacitors 67 and 70 serve to prevent malfunction and the diode 68 is operative to prevent a reverse voltage from being applied to the thyristor 60. The pulse generator 64 generates pulses having a pulse repetition period as determined thereby and at time points at which the thyristor 21 is to be fired. In other words, the pulse generator 64 determines also a firing phase angle or a conduction angle of the thyristor 21.

Figure 17:
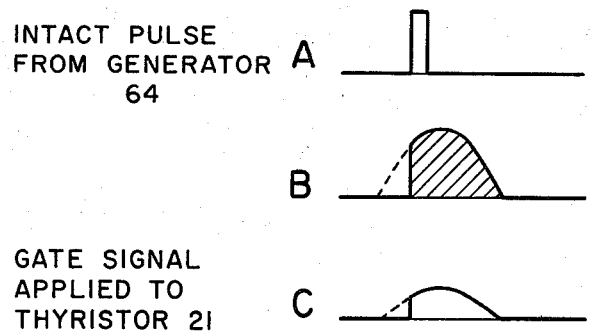
FIG. 17 is a graph illustrating waveforms developed at different points in the arrangement shown in FIG. 16.
Figure 18:
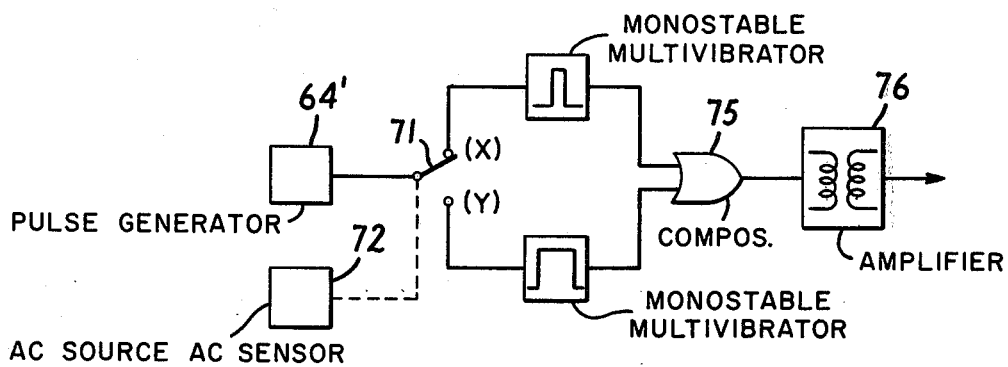
FIG. 18 is a block diagram of a modification of the gate control circuit shown in FIG. 15.

In the chopping mode of operation in which gating signals relatively narrow in pulsewidth are applied to the thyristor 21, a narrow output signal from the pulse generator 64 is applied to the gate electrode of the thyristor 21 through the gate circuit of the thyristor 60 while it remains intact as shown at waveform A in FIG. 17. This is because no voltage is induced across the secondary winding of the transformer 61 due to the absence of the power source 63.

In the phase control mode of operation due to the particular AC power source, the pulse generator 64 generates the waveform A as shown in FIG. 17 while a voltage is induced across the secondary winding of the transformer 61. The output pulse from the generator 64 brings the thyristor 60 into its ON state as shown by hatched portion of waveform B in FIG. 17 while secondary voltage from the transformer 61 is applied across the thyristor 60 (see waveform C, FIG. 17). The secondary voltage continues to be applied across the thyristor 60 until one half cycle of that voltage terminates. As a result, a gating signal from the thyristor 60 is maintained at the gate electrode of the thyristor 21 for at least a time interval within which the load current flowing through the conducting thereof. Namely the gating signal having waveform C shown in FIG. 17 is applied to the thyristor 21.

The arrangement of FIG. 16 is advantageous in that the pulsewidth of the gating signal can be reliably set with a simple construction. In addition, the output voltage from the pulse generator 64 is serially applied to the gate circuits of the thyristors 21 and 60 so that a barrier voltage for gate triggering is developed for each of the two thyristors. This results in the provision of a gate circuit relatively immune to noise caused around gate wirings involved.

It will readily understood that the thyristor 20 is connected to another arrangement identical to that shown in FIG. 16. Also the arrangement may be operatively associated with the bridge circuit of FIG. 15 formed of thyristors alone.

The gate control circuit 27 can be also formed as shown in FIG. 17. As shown in FIG. 17, a pulse generator 64' is connected to a transfer switch 71 controlled by a power source 72 for sensing the connection of an AC power source (not shown) across the terminals A and B as shown in FIG. 15. The transfer switch 71 includes a pair of operating position (X) and (Y) connected to a pair of monostable multivibrators 73 and 74 respectively. Then both multivibrators 73 and 74 are connected to a composing circuit shown as an "OR" circuit 75 subsequently connected to an amplifier 76.

The pulse generator 64' is operative to determine a pulse repetition period for controlling the ON time of the bridge circuit with the thyristors in response to an electric power supplied to the DC load and to generate pulses with the pulse repetition period thus determined. The source sensor 72 receives the pulses from the pulse generator 64' to put the transfer switch 71 in its operating position (X) in the chopping control mode of operation and in its operation (Y) in the phase control mode.

In the chopping control mode, the monostable multivibrator 73 produces, pulses relatively narrow in pulsewidth which pulses are applied to the thyristor 21 through the composing circuit 75 and the amplifier 76.

In the phase control mode the monostable multivibrator 74 produces pulses relatively broad in pulsewidth which pulses are similarly to the thyristor 21.

The arrangement of 18 is characterized by an extremely simple and inexpensive construction.

Figure 19:
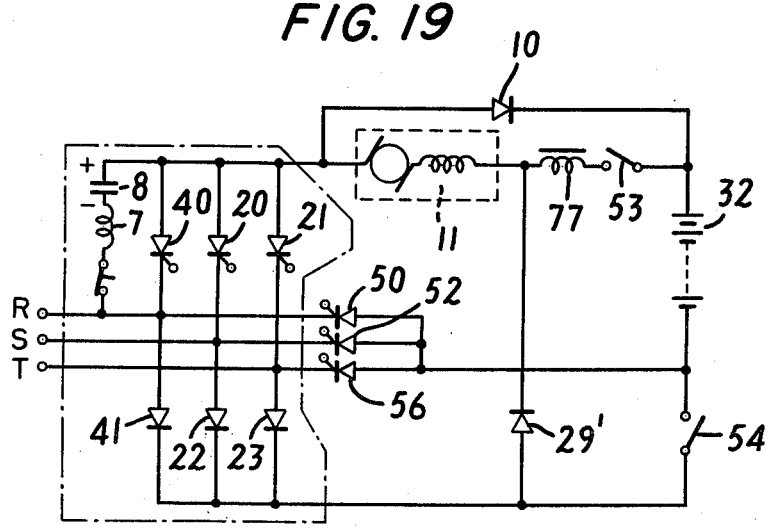
FIG. 19 is a schematic circuit diagram of a modification of the arrangement shown in FIG. 12.

An arrangement as shown in FIG. 19 is different from that illustrated in FIG. 12 only in that in FIG. 19, a current suppressing reactor 77 is connected between the DC motor and switch 11 and 52 respectively.

When energized by an AC power source and operated in the phase control mode, the arrangement of FIG. 12 does not bring out a problem in the rise of the load current for small firing phase angles. However when energized by a DC power source and operated in the chopping control mode, the same arrangement is required to suppress the rise of load current because of a high source voltage frequently resulting in the necessity of adding a further inductance to an inductance originally included in the motor circuit. To this end, the current suppressing reactor 77 has been connected to the DC motor 11 in the arrangement of FIG. 19. That reactor is also effective for making a charging current through the battery 32 constant current.

Figure 20:
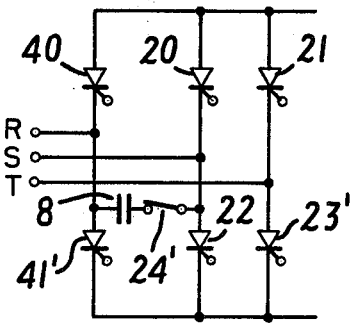
FIG. 20 is a fragmental circuit diagram of a modification of one portion of the arrangement shown in FIG. 19.

FIG. 20 shows an arrangement including thyristors 41', 22' and 23' substituted for the diodes 41, 22 and 23 as shown in FIG. 19 and a series combination of capacitor and switch 8 and 24' connected across the anode electrodes of the thyristors 41' and 22' with the series combination of capacitor 8, reactor 7 and switch 24' as shown in FIG. 19 omitted. The bridge circuit is formed of the thyristor 20, 21, 40, 22', 23' and 41' and the auxiliary commutation circuit includes only the commutation capacitor 8.

In the operation by a three-phase AC power source, all the thyristors are operated the phase control mode with the switch 24' maintained in its open position. In the operation by the battery, however, the switch 24' is maintained in its closed position and the thyristors are fired to accumulate a commutation energy on the capacitor 8 with the polarity ilustrated in FIG. 19. Then the thyristors 20 and 22' are fired to supply a power from the battery to the DC load after which the thyristor 41' is fired to turn the thyristors 20 and 22' off with the commutation energy accumulated on the capacitor 8, thereby to terminates the power supply to the load. In this way the load has been put in the chopping control.

Figure 21:
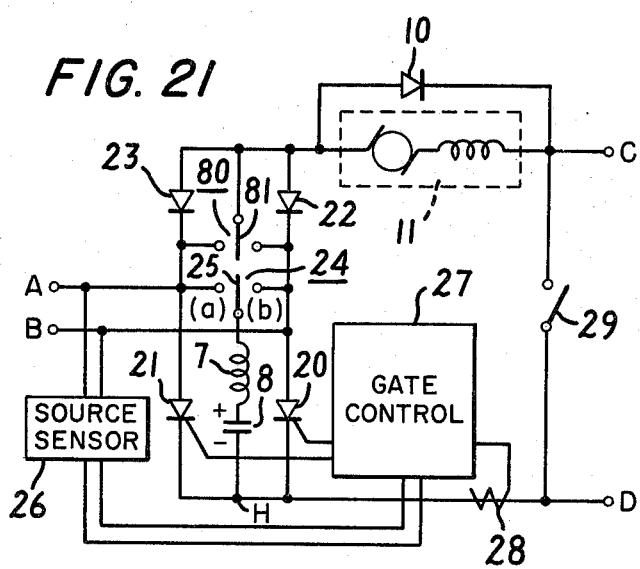
FIG. 21 is a circuit diagram of another modification of the arrangement shown in FIG. 4.

FIG. 21 shows a modification of the arrangement as shown in FIG. 4. The arrangement illustrated is different from that shown in FIG. 4 only in that in FIG. 20 another transfer switch 8 is operatively associated with the diodes 22 and 23 so that its movable arm 81 is connected to the anode electrode of the diodes 21 and 23 and a pair of stationary contacts (a) and (b) are connected to the cathode electrodes of the diodes 22 and 21 respectively.

The source sensor 26 senses the presence of an AC power source (not shown) across the terminals A and B to put and maintain the movable switch arm 81 in its neutral position illustrated in FIG. 21, in addition to putting and maintaining the movable arm 25 of the transfer switch 24 in its neutral position as in the arrangement of FIG. 4. In the absence of such an AC power source the sensor 26 is operative to engage both movable arms 25 and 81 with the associated stationary contacts labelled the same reference characters. For example both movable arms 25 and 81 may be simultaneously engagement with the associated stationary contact (a) to connect the series combination 7–8 across the thyristor 21 and shortcircuit the diode 22.

Thus the arrangement of FIG. 21 is substantially identical in operation to that shown in FIG. 4 excepting that in FIG. 20 the diode 22 or 23 is shortcircuited. Also as in the arrangement of FIG. 4 a gating signal with a relatively broad pulsewidth may be applied to the thyristor 20 to operate the arrangement with either of AC and DC power shource while both movable arms 25 and 81 are in engagement with the respective stationary contacts 9a) or (b) of the transfer switches 24 and 80.

The arrangement is advantageous in that voltage drop across the bridge circuit decreases because either one of the diodes 22 and 23 is shortcircuited while the chopping action is retained. As a result, a loss in the power control is decreased as compared with the arrangement of FIG. 4 for example, leading to an increase in control efficiency in the operation by an DC power source having a relatively low voltage.

FIGS. 22a through 22d show various modifications of the bridge circuit illustrated in FIG. 21 and suitable for use with the single-phase AC power source. In FIG. 22a the thyristors are disposed on the negative side of the bridge circuit while the diodes are disposed on the positive side thereof. In FIG. 22b the bridge circuit is formed of four thyristors and in FIG. 22c it is formed of three thyristors and a single diode. FIG. 22d show a bridge circuit capable of driving the DC load with all alternate half cycles of the particular AC power source. In the operation by a DC source that thyristor or diode disposed on the side of main thyristor is shortcircuited as will readily be understood from the description for FIG. 21.

The bridge circuit as shown in FIG. 21 can be modified to be suitable for use with the three-phase AC power source as shown in FIGS. 23a and 23b. In FIG. 23a a series combination of thyristor and diode is connected across the bridge circuit as shown in FIG. 21 and the junction of the added thyristor and diode is connected to a third one of three-phase input terminals. A normally open switch is connected across the added diode. An arrangement shown in FIG. 23b having connected thereacross a series combination of two thyristors. The junction of the added thyristor is connected a third input terminal and also to a transfer switch capable of shortcircuiting either one of the added transistors.

FIG. 24 shows a modification of the arrangement as shown in FIG. 13. The arrangement illustrated comprises a thyristor 20, a semiconductor diode 22 connected to the thyristor 20 through one pole portion of a double pole transfer switch 82 and a series combination of thyristor and semiconductor diode 21 and 23 respectively with the anode electrodes of both diodes 22 and 23 interconnected. The thyristor 21 is conected across a series combination of commutation reactor and capacitor 7 and 8 respectively through a switch 24' shown in its open position.

A pair of AC terminals $A_1$ and $B_1$ are connected to the anode electrode of the thyristor 20 and the junction of the thyristor 21 and the diode 23 respectively.

A DC load shown as a DC motor 11 is connected at one end to the junction of the diodes 22 and 23 and at the other end to a cathode electrode of a semiconductor diode 29' and through the other pole portion of the switch 82 to the cathode electrode of the diode 22. The diode 29' serves as a switch. The diode 29' has an anode electrode connected to the cathode electrodes of the thyristors 20 and 21.

A battery 32 is selectively connected across the diode 29' and a smoothing reactor 37 through a transfer switch 30''. The reactor 37 is connected to cathode electrodes of thyristors 33 and 34 forming a phase control bridge circuit with a pair of semiconductor diodes 33 and 36. The diodes 35 and 36 have anode electrodes connected to the cathode electrodes of the thyristors 20 and 21. The junctions of thyristors and diodes are connected to a pair of AC input terminals $A_2$ and $B_2$ respectively.

Where it is desired to drive the DC motor 11 by the battery 32, the switches 24' and 82 are in their positions illustrated in FIG. 24. That is the switch 24' is closed to connect the series combination of the reactor and capacitor 7 and 8 respectively across the thyristor 21 to complete a commutation circuit, and the transfer switch 30'' is in its position (a) to serially connect the DC motor 11 to the battery 32. Each pole portion of the transfer switch 82 is in its position (b) in readiness for the chopping control. Then the thyristor 20 acts as the main thyristor while the thyristor 21 acts as a commutation thyristor. Also the diode 22 is connected across the DC motor 11 serving as a commutation diode. Thus the arrangement is identical in circuit configuration to the arrangement as shown in FIG. 21 having a DC power source connected across the terminals C and D and the movable arms 25 and 81 engaged by the stationary contacts (a) of the transfer switches 24 and 80. From this it will be appreciated that the arrangement of FIG. 23 is identical in operation to that shown in FIG. 21.

With an AC power source (not shown) connected across the terminals $A_1$ and $B_1$ and across terminals $A_2$ and $B_2$, the switch 24' is open to disconnect the commutation circuit 7–8 from the thyristor 21, the transfer switch 30'' switches to its position (b) to connect the battery 32 to the rectifier bridge circuit 33–34–35–36 through the reactor 37 and the each pole portion of the transfer switch 82 also is in its position (a) to form a phase control bridge circuit of the thyristors 20 and 21 and the diodes 22 and 23. A lead circuit is formed of the serially connected diode and DC motor 29' and 11 respectively.

Therefore the power supply to the DC motor 11 can readily be controlled by controlling the firing phase angles of the thyristors 20 and 21. At the same time the battery 32 is possible to be charged through the thyristors 33 and 34 operated in the phase control mode.

As in the foregoing embodiments, the pair of thyristors used as a thyristor chopper in the operation by the battery can also utilize as phase control thyristors in the operation by an AC power source. Further by additionally providing a third switch or the transfer switch 82, the diode for preventing the discharge of the capacitor and the diode for commutating the load current during the operation of the chopper circuit can be also used as rectifier diodes in the rectifier bridge circuit. This results in a further simplified construction. In addition, the occurrence of a fault on either one of the thyristors 20 and 21 does not lead to the complete suspension of the operation as in the arrangement above described.

If it is not required to charge the battery 32 then the rectifier bridge circuits 33 through 36, the reactor 37 and the terminals $A_2$ and $B_2$ may be omitted.

FIG. 25 shows still another modification of the present invention. The arrangement illustrated comprises a series combination of a thyristor 20 and a semiconductor diode 22 and another series combination of a thyristor 83, a thyristor 21 and a semiconductor diode 23 to form a bridge circuit with the thyristor 21 connected across a commutation circuit composed of a reactor 7 and a capacitor 8 serially interconnected. A DC load such as a DC motor 11 is connected to a transfer switch 30'' serving to connect the DC motor 11 directly or through a battery 32 across the bridge circuit. A commutation diode 10 is connected across the serially connected DC motor and transfer switch 11 and 30'' respectively.

A pair of AC terminals A and B are connected to the junction of the thyristor and diode 21 and 23 respectively and the junction of the thyristor and diode 20 and 21 respectively.

The operation of the arrangement as shown in FIG. 24 will now be described with reference to FIGS. 26 and 27. FIG. 26 shows waveforms developed at various points in the arrangement of FIG. 25 in the phase control mode of operation while FIG. 27 shows waveforms developed in the chopping control mode of operation.

It is now assumed that an AC power source (not shown) is connected across the AC terminals A and B and that the DC motor 11 is operated in the phase control mode with the transfer switch 30'' put in its position (a) illustrated in FIG. 25. It is also assumed that at time point of $t_o$ (see FIG. 25) an AC voltage from the AC power source is applied across the terminals A and B so as to render the terminal A positive with respect to the terminal B while the thyristors 20 and 21 are in their OFF state and a voltage across the capacitor 8 is of a null magnitude.

Then at time point of $t_1$ a gating signal (see waveform B, FIG. 25) is applied to both thyristors 21 and 23 to turn them on. This causes a load current resulting from an AC source voltage (see waveform A, FIG. 25) to flow through a current path traced from the terminal A through the thyristors 21, the thyristor 83, the switch 30'', the DC motor 11, the diode 22 and thence to the terminal B while the load current $i_M$ is increased as shown at waveform D in FIG. 26. At time point of $t_3$ the gating signal disappears (see waveform B, FIG. 26) after which a commutation current caused from an inductance included in a circuit with the motor 11 continues to flow through a current path traced from the DC motor 11 through the diode 23, the thyristor 21, the thyristor 83, the switch 30″ and thence back to the DC motor. Due to the absence of an externally applied voltage, the current is attenuated with time as shown at waveform D in FIG. 26.

After the source voltage has been inverted in polarity at time point of $t_2$, a gating signal (see waveform C, FIG. 26) is applied to the thyristor 20 to turn it on at time point of $t_3$. Thus the source voltage is permitted to be supplied to the DC motor 11 to increase the load current $i_M$ (see waveforms A and D, FIG. 26). More specifically the load current flows through a current path including the terminal A, the thyristor 20, the switch 30″, the DC motor 11, the diode 23 and the terminal B. Also the thyristors 21 and 83 are reversely biased by the AC power source (not shown) to be turned off. Then time point of $t_4$ is reached at which the AC power source is inverted in polarity and the gating signal on the thyristor 20 terminates. However because of the thyristors 21 and 83 in their OFF state a commutation current from the DC motor 11 continues to flow through the diode and thyristor 22 and 20 respectively until the gating signal is again applied to both thyristors 21 and 83.

Thereafter the process as above described is repeated. By changing time points at which gating signals are to be applied to the thyristors 20, 21 and 83, the DC motor 11 can be controlled in both voltage and current.

The purpose of the thyristor 83 is to prevent an electric charge from being accumulated on the capacitor 8 with the AC source (not shown) across the terminals A and B so poled that the terminal A is positive with respect to the terminal B. If desired, the thyristor 83 may be replaced by a semiconductor diode which will be described in detail hereinafter. Also if desired, the diode 10 may be connected across the DC motor 11 alone. In the latter case the commutation current flows through the diode 10.

With no AC power source connected across the terminals A and B, the battery 32 can be utilized to drive the DC motor in the chopping control mode of operation. It is assumed that the transfer switch 30″ is in its position (b) and that the capacitor 8 has been fully charged with the polarity illustrated through the thyristor 83 put in its ON state. The operation of the arrangement as shown in FIG. 24 will now be described with reference to FIG. 27.

At time point of $t_1$, a gating signal (see waveform A, FIG. 27) is applied to the thyristor 20 acting as the main thyristor to turn it on. This causes a load current to flow through a current path traced from the battery 32 through the switch 30″, the DC motor 11, the diode 22, the thyristor 20 and thence back to the battery and the load current $i_M$ is increased with time as shown at waveform E in FIG. 27. At time point of $t_2$ the load current reaches a predetermined magnitude whereupon a gating signal (see waveform B, FIG. 27) is applied to the thyristors 21 and 83 to turn them on. This permits the charge (see waveform D, FIG. 27) on the capacitor 8 to flow, as a discharging current, through a current path traced from the capacitor 8 through the reactor 7 and the thyristor 21 and thence back to the capacitor. A resonance circuit including the reactor and capacitor 7 and 8 respectively is operated to accumulate an electric charge on the capacitor 8 substantially equal and opposite to the original charge thereon after one half cycle of the resulting oscillating current.

In the next half cycle of the oscillating current a reverse voltage is applied across the thyristor 21. Thus the thyristor 21 tends to go to its OFF state while the capacitor 8 discharges through a current path traced from the capacitor 8 through the thyristor 83, the battery 32, the switch 30″, the DC motor 11, the diode 23, the reactor 7 and thence back to the capacitor. As a result, the principal current (see waveform D, FIG. 27) flowing through the diode 22 and the thyristor 20 is commutated through the discharging circuit for the capacitor 8, whereby the capacitor 8 applies reverse voltages across the thyristors 20 and 21 resulting in their turning off.

When the gating signals applied to the thyristors 21 and 82 has pulsewidths preset to be slightly larger than the duration of positive half cycle of the oscillating current, the gating signal on the thyristor 83 disappear when the capacitor 8 has been again fully charged with the polarity illustrated. Therefore, as soon as the capacitor has been fully charged, the thyristor 83 is turned off. As a result, the load current through the DC motor 11 is initiated to be commutated through the diode 10 and decreased (see waveform E, FIG. 27) until it is lowered to a predetermined magnitude at time point of $t_3$.

At that time a gating signal is again applied to the thyristor 20 to turn it on to initiate an increase in load current. Thus the process as above described is repeated to control the power supply to the DC motor.

It is noted that in FIG. 27, waveform D has the polarity identical to the polarity of the capacitor 8 illustrated in FIG. 25.

In the arrangement of FIG. 25, if any element, for example, the thyristor 20 has been disabled, then the operation can continue to be performed by disengaging the thyristor 20 from the other elements. More specifically, during the operation by an external AC power source, a one-sided phase operation may be performed by applying a gating signal to the thyristors 21 and 83 alone when the terminal A is positive with respect to the terminal B. During the operation by the battery, it is possible to operate the arrangement as an externally forced chopper by intermittently applying the gating signals to the thyristors 21 and 83. In the latter case the capacitor 8 is first charged with the polarity illustrated and then the thyristors 21 and 83 are turned on. Thereby the capacitor 8 is discharged by having an LC oscillating current flowing through a current path traced from the capacitor 8, the reactor 7, the thyristor 21 and thence back to the capacitor until it is charged with the polarity reversed from that illustrated.

In the next half cycle of the oscillating current, the capacitor 8 is discharged through the thyristor 83 and the DC motor 11 to supply a load current to the DC motor 11 while the thyristor 21 is reversely biased to be turned off. Then the capacitor 8 is again charged with the polarity illustrated whereupon the load current is commutated through the diode 10 resulting in its decrease. Subsequently the thyristors 21 and 83 are again turned on to repeat the process as above described. Thus an externally forced commutation circuit with a fixed ON time is formed.

Also by putting the transfer switch 30'' in its position (b) in the phase control mode of operation, the DC motor can be applied with the sum of the voltage across the battery and a rectified voltage resulting from the particular AC power source. With the battery inverted in polarity it is possible to charge the battery while at the same time, the DC motor is applied with a difference between the voltage across the battery and the rectified voltage resulting from the AC power source. Therefore the speed control can be effected in a further broad range.

FIG. 28 shows a modification of the arrangement shown in FIG. 25 wherein the thyristor 20 and the diode 22 are exchanged in position as do the thyristor 83 and the diode 23. Also the terminal A is connected to the junction of the thyristor and diode 20 and 22 respectively while the terminal B is connected to the capacitor 8 at the junction of the thyristor and diode 21 and 23 respectively. In other respect the arrangement is identical to that shown in FIG. 24.

An arrangement as shown in FIG. 29 is different from that shown in FIG. 25 only in that in FIG. 29 the diode 22 is connected at the cathode electrode to the thyristor 20 through a transfer switch 82' and also to the junction of the DC motor 11 and the battery 32 through an another transfer switch 82''. The diode 22 has the anode electrode connected to the diode 23 at the anode electrode. In these respects the arrangement is identical to that shown in FIG. 24. Thus it has the advantages as above described in conjunction with FIG. 24. Further the cathode side of the thyristors 20 and 83 is selectively connected to the DC motor and battery 11 and 32 respectively through a transfer switch 30''.

Figure 30:
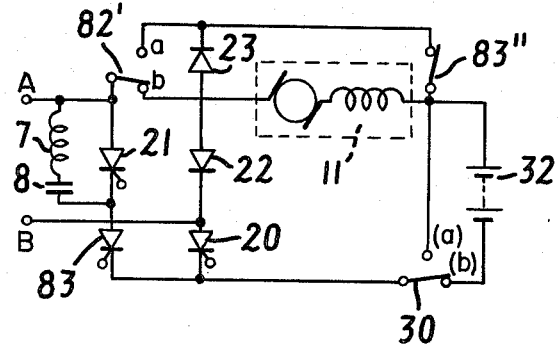

An arrangement as shown in FIG. 30 is similar to that illustrated in FIG. 29 excepting that the diode 23 rather than the diode 22 also serves as a commutation diode.

Figure 31:
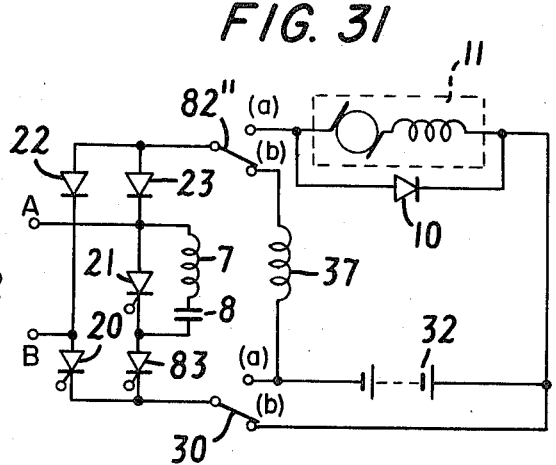

An arrangement as shown in FIG. 31 is different from that illustrated in FIG. 25 only in that in FIG. 31 the battery 32 can be charged from an AC power source (not shown) connected across the input terminals A and B. The bridge circuit identical to that shown in FIG. 25 is selectively connected across the DC motor 11 and a series combination of a smoothing reactor and battery 37 and 32 respectively through a pair of transfer switches 82'' and 30.

With the DC motor 11 operated in the phase control mode, the transfer switches 82'' and 30 are in their positions (a) and (b) respectively. In the chopping control mode of operation the switches 82'' and 30 are in their positions (a) and (b) respectively. With the battery charged in the phase control mode, both switches are in their positions (b).

The battery 32 may be arranged in series-parallel combinations for charging purposes. Further the switches 82'' and 30 may be in their positions (a) to apply the sum of the voltage across the battery 32 and a rectified voltage resulting from the particular AC voltage supplied across the terminals A and B in order to perform the high speed operation.

Figure 32:
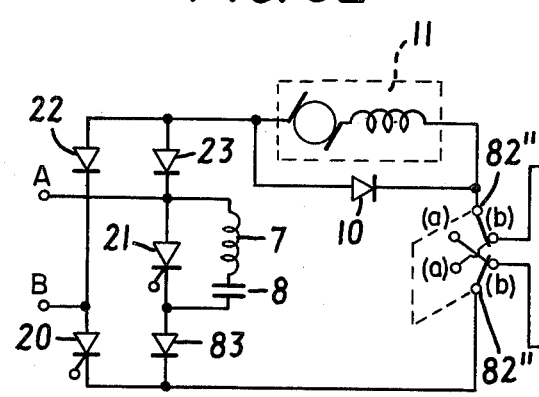

In an arrangement shown in FIG. 32 a semiconductor diode 83' is substituted for the thyristor 83 as shown in FIG. 25 while the battery 32 is adapted to be charged simultaneously with the operation of the DC motor 32 in the phase control mode by serially connecting the DC motor 11 to the battery 32. A pair of transfer switches 83'' and 30 are in their positions (a) in the phase control mode and in their positions (b) in chopping control mode of operation.

The purpose of the diode 83' is to prevent an electric charge from being accumulated on the capacitor 8 when the terminal A is positive with respect to the terminal B as above described. More specifically for a time interval during which the terminal A is positive with respect to the terminal B and also the thyristor 21 is in its OFF state, a current flows through a current path including the terminal A, reactor 7, the capacitor 8, the diode 83', the switch 30, the DC motor 11, diode 22 and the terminal B to charge the capacitor 8 to a voltage substantially equal to the peak magnitude to the applied AC voltage. Upon turning the thyristor 21 on, the charge on the capacitor 8 discharges through a current path traced from the capacitor 8, reactor 7, the thyristor 21 and thence back to the capacitor until the capacitor 8 has accumulated thereon an electric charge opposite and substantially equal to the just preceding charge.

Then the charge now accumulated on the capacitor 8 causes a flow of reverse current through the circuit with the DC motor 11 until the voltage across the capacitor 8 becomes null. Since an LC circuit composed of the reactor 7 and the capacitor 8 has a time constant small as compared with the frequency of an AC power source connected across the terminals A and B, one cycle of the resulting oscillating current is permitted only to flow through the circuit during one half cycle of the AC power source rendering the terminal A positive with respect to the terminal B. Therefore the operation of the arrangement is not adversely affected.

Figure 33:
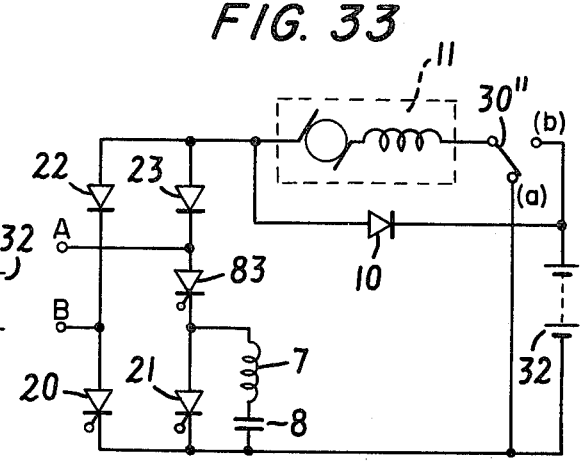

FIG. 33 shows a modification of the arrangement illustrated in FIG. 25 wherein the thyristor 21 with the serially connected reactor and capacitor 7 and 8 respectively and the thyristor 83 are exchanged in position.

Figure 34:
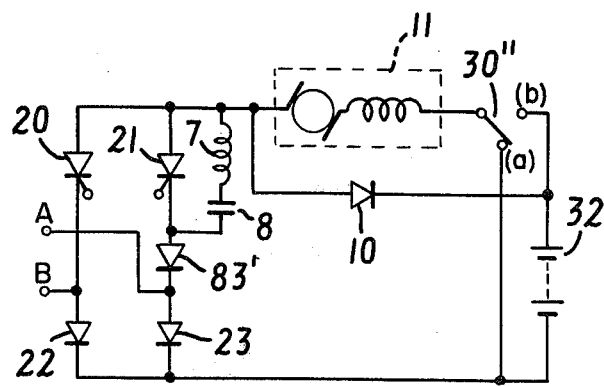

FIG. 34 shows a modification of the arrangement illustrated in FIG. 33 wherein the thyristor 21 with the serially connected reactor and capacitor, the diode 83' and the diode 22 are serially connected in the named order across the positive and negative sides of the bridge circuit.

Figure 35:
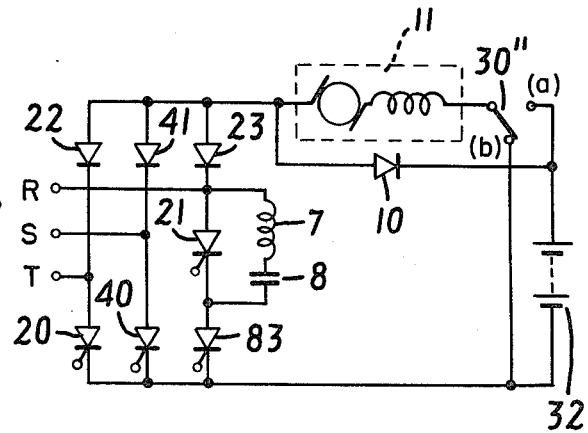
FIG. 35 is a schematic circuit diagram of another modification of the arrangement shown in FIG. 25 and suitable for use with a three-phase AC power source.

FIG. 35 shows another modification of the arrangement as illustrated in FIG. 25 suitable for use with a three-phase AC power source. A series combination of a thyristor 40 and a semiconductor diode 41 is connected across a bridge circuit identical to that shown in FIG. 25 and the junction of thyristor 40 and diode 41 is connected to a third input terminal S with the remaining terminals labelled R and T but not A and B.

Each of series combinations 20–22 or 40–41 may be considered to be a circuit through the principal current flows, upon the occurrence of a fault on the thyristor or diode in either one of those series combinations the remaining series combination can be used to effect the chopper control. Further the arrangement may be used with a single-phase AC source.

In summary, the present invention provides an AC/DC power source apparatus comprising a bridge circuit including at least one series combination of a thyristor and a semiconductor diode and another series combination of at least one thyristor and at least one semiconductor diode interconnected in parallel circuit relationship, the bridge circuit being operative in the phase control mode, and an LC circuit connected across the thyristor of the other series combination to form a commutation circuit. The apparatus is possible to control a load driven by either an external AC power source of the single or three phase type or by a battery disposed within the apparatus through the use the same elements without the switching of circuits. Also the internal battery is possible to be charged from the external power source. Further by changing the connection of the battery to the load, a voltage applied to the load is adjustable. In addition, it is possible to charge the battery simultaneously with driving of the load. Upon the occurrence of a fault on one of the thyristor or one of the diodes, a one-sided phase of the external AC power source can be used to effect the phase control or the externally forced commutation thereby to perform the operation in order to avoid an emergency.

While the present invention has been illustrated and described in conjunction with various preferred embodiments thereof it is to be understood that numerous changes and modifications may be resorted to without departing from the spirit and scope of the present invention.

What we claim is:

1. An AC/DC power source apparatus comprising, in combination, AC input terminal means capable of being connected across AC power source means bridge circuit means connected to said AC input terminal means to rectify an alternating current supplied thereto through said terminal means to produce a rectified output, said bridge circuit means including a pair of rectification output ends DC load means connected across said bridge circuit means to be supplied with said rectified output, DC input terminal means connected across said pair of rectification output ends of said bridge circuit means and also capable of being connected across a DC power source means, and circuit means connected across said DC input terminal means to pass an alternating current therethrough and to prevent a direct current from passing therethrough.

2. An AC/DC power source apparatus as claimed in claim 1 wherein said bridge circuit means includes a thyristor, and said DC input terminal means is connected across said pair of rectification output ends of said bridge circuit means so that a direct current from said DC input terminal means passes through said thyristors and wherein there are provided gate control means for controlling the conduction of said thyristor and commutation circuit means for said thyristor connected across one portion of said bridge circuit means.

3. An AC/DC power source apparatus comprising in combination, a DC load, a pair of DC input terminals, one of said DC input terminals being connected to one end of said DC load, a bridge circuit including a pair of DC ends connected to the other of said DC input terminals and the other end of said DC load respectively, said bridge circuit being formed of a plurality of series combinations connected in parallel circuit relationship with one another to be so poled that currents flow in the same direction therethrough each of said series combinations including a thyristor and a selected one of another thyristor and a semiconductor diode serially connected to the first-mentioned thyristor to be so poled that currents flow in the same direction therethrough, said pair of DC input terminals being capable of being connected across a DC power source, a first switching element, a separate series combination of a reactor and a capacitor said switching element being responsive to the connection of said DC power source across said pair of DC input terminals to connect said separate series combination across a selected one of the first-mentioned thyristors, a plurality of AC input terminals each connected to the junction of the first-mentioned thyristor and the selected one of the other thyristors and the semiconductor diode in a different one of said series combinations said plurality of AC input terminals being capable of being connected to an AC power source, and a second switching element responsive to the connection of said AC power source to said plurality of AC input terminals to connect said DC load to said bridge circuit into a closed circuit.

4. An AC/DC power source apparatus comprising, in combination, a bridge circuit including a plurality of series combinations connected in parallel circuit relationship to be so poled that currents flow in the same direction therethrough and having a pair of DC output ends, each of said series combinations including a thyristor and a selected one of another thyristor and a semiconductor diode serially connected to the first-mentioned thyristor to be so poled that currents flow in the same direction therethrough, switching means for sensing the presence of an AC power source forming one power source capable of being connected to the junctions of the first-mentioned thyristor and the selected one of the other thyristor and the semiconductor diodes disposed in said series circuits, an auxiliary commutation circuit including a reactor and a capacitor serially interconnected, said switching means being operative to connect said auxiliary commutation circuit across a predetermined one of the first-mentioned thyristors when said apparatus is operated by a battery forming another power source, charging means including an output side to charge said battery, and a DC motor, the arrangement being such that, when said apparatus operated with said AC power source, said charging means has said output side connected to said battery through said switching means and receives an electrical energy from said AC power source to charge said battery, and that, when driven by said AC power source, said DC motor is disconnected from said battery by means of said switching means and connected across said pair of DC output ends of said bridge circuit to be controlled in power supply thereto through said bridge circuit while, when driven by said battery, said DC motor is connected in series with said bridge circuit across said pair of DC output ends of said bridge circuit whereby said bridge circuit controls an electrical energy supplied to said DC motor from said battery.

5. An AC/DC power source apparatus comprising, in combination, a bridge circuit including a series combination of a diode and a first thyristor, a pair of DC input terminals connected across said bridge circuit, a plurality of AC input terminals each connected to a different one of the junctions disposed in said bridge circuit, a load circuit including a second thyristor and a DC motor serially connected across said pair of DC input terminals, a battery circuit including a third thyristor and a battery serially connected across said pair of DC input terminals, a series combination of a reactor and a capacitor connected across said first thyristor in the operation by said battery, and a switch circuit responsive to the presence of an AC power source to permit a current to flow into both said battery circuit and said load circuit, through another reactor, said switch circuit being operative to connect said battery circuit, said bridge circuit and said load circuit in series circuit relationship in the operation by said battery.

6. An AC/DC power source apparatus comprising, in combination, a bridge circuit including a semiconductor diode and a thyristor and having a pair of DC input terminals and a plurality of AC input terminals, a DC motor connected to one of said pair of DC input terminals, a battery circuit including a battery and a thyristor connected to the one of said DC input terminals, a series combination of a reactor and a capacitor connected across said thyristor included in said bridge circuit in the operation by said battery, and a switch circuit responsive to the presence of an AC power source to permit a current to flow into both said battery circuit and said DC motor through another reactor, said switch circuit being operative to connect said battery, said bridge circuit and said DC motor in series circuit relationship.

7. In an AC/DC power source apparatus for controlling a DC motor with either of a battery and an AC power source, the combination of a first rectifier bridge circuit including a control thyristor to rectify an AC voltage, another thyristor forming a second rectifier bridge circuit with one portion of rectifier elements forming said first rectifier bridge circuit, a DC motor connected to the output side of said first rectifier bridge circuit, a battery connected to the output side of said rectifier bridge circuit, and an auxiliary commutation circuit connected across a selected one of thyristors included in said first rectifier bridge circuit.

8. An AC/DC power source apparatus comprising, in combination, a first series combination of a first thyristor and a selected one of another thyristor and a semiconductor diode serially interconnected to be so poled that currents flow in the same direction therethrough, a second series combination of a second thyristor and a selected one of a separate thyristor and a separate semiconductor diode serially interconnected to be so poled that current flow in the same direction therethrough, a bridge circuit including said first series combination and said second series combination interconnected in parallel circuit relationship to be so poled that currents flow in the same direction therethrough,, said bridge circuit having an output side, a third series combination of a reactor and a capacitor connected across said second thyristor of said second series combination a selected one of an additional thyristor and an additional semiconductor diode for connecting the junction of said first thyristor and the selected one of said another thyristor and said semiconductor diode in said first series combination to the junction of said second thyristor of said second series combination and said third series combination and disposed in a direction to charge said capacitor of said third series combination, a DC load connected across said the DC side of said bridge circuit, a pair of input terminals formed of the junction of said first thyristor and the selected one of said another thyristor and said semiconductor diode in said first series combination and of the junction of a selected pair of two other thyristors and two other semiconductor diodes connected to said second thyristor of said second series combination, said pair of input terminals being capable of being applied with either of alternating current and direct current.

9. In an AC/DC power source apparatus comprising a bridge circuit including a thyristor with a gate electrode to control a power of either of alternating current and direct current, the combination of a pulse generator for generating a pulse signal to control said gate electrode of said thyristor, a transformer including a primary winding capable of being connected across an AC power source and a secondary winding, and a combining thyristor including a gate electrode and connected between said second winding of said transformer and said gate electrode of said thyristor in said bridge circuit to combine said pulse signal applied to gate electrode thereof from said pulse generator with a synchronizing signal resulting from said AC power source to form a gating signal for said gate electrode of said thyristor of said bridge circuit.

10. In an AC/DC power source apparatus comprising a bridge circuit including a thyristor with a gate electrode to control a power of either of alternating current and direct current, the combination of a pulse generator for generating a pulse for controlling said gate electrode of said thyristor, a first monostable multivibrator for producing a pulse narrow in pulsewidth, a second monostable multivibrator for producing a pulse broad in pulsewidth, a transfer switch means for connecting the pulse from said pulse generator to said second monostable multivibrator during the control of an AC power and connecting the pulse from said pulse generator to said first monostable multivibrator during the control of a DC power, and a gating amplifier selectively driven by first monostable multivibrator and said second monostable multivibrator to form a gating singal for said gate electrode of said thyristor.

11. An AC/DC power source apparatus comprising, in combination circuit means including bridge circuit means including a plurality of input terminals for an AC power source means a DC side at least a thyristor, and auxiliary commutation circuit means including at least a capacitor, said circuit means, performing the phase control operation when the same is driven by the AC power source means and performing the chopping operation when the same is driven by a DC power source means, DC load means serially connected at one end to one end of said DC side of said circuit means, current suppressing reactor means serially connected at one end to the other end of said DC load means, battery means serially connected at one end to the other end of said current suppressing reactor means, charging control means connected to the other end of said battery means and also to said circuit means, switch means connected between the junction of said charging control means and said battery means and the other end of said DC side of said circuit means, said switch means being used with the operation by said battery means, and switching means connected at one end to the junction of said DC load means and said current suppressing reactor means and at the other end to the junction of said circuit means and said switch means.

12. An AC/DC power source apparatus comprising, in combination, a rectifier bridge circuit including a plurality of first series combinations connected in parallel circuit relationship, each of said first series combinations including a thyristor serially connected to a rectifier element, said rectifier bridge circuit having a DC side, a DC load connected at one end to one end of said DC side of said rectifier bridge circuit, a pair of DC input terminals formed of the other end of said DC load and the other end of said DC side of said rectifier bridge circuit, a plurality of AC input terminals each formed of the junction of said thyristor and said rectifier element in a different one of said first series combinations, a second series combination of a reactor and a capacitor connected across a selected one of said thyristors of said first series combinations, in the presence of an DC input, means for short circuiting those elements not operated as the main thyristor in said first series combinations when said series combinations perform the chopping operation in the presence of the DC input.

13. An AC/DC power source apparatus comprising in combination, a first combination of a first thyristor and a first semiconductor diode, a second series combination of a second thyristor and a second semiconductor diode, a third series combination of a first switch, a reactor and a capacitor connected across said first thyristor, said second thyristor being connected at one end to said first series combination to be so poled that currents flows in the same direction therethrough and in parallel circuit relationship with said first series combination, a DC load serially connected to said first series combination, a DC power source a second switch switched to connect said first series combination, said DC load and said DC source in series circuit relationship when said DC load is driven by said DC power source, a pair of AC input terminals disposed on that side of said second thyristor not connected to said first thyristor and a third switch for connecting said second thyristor across said first series combination and forming a commutation circuit for said DC load when said DC load is driven by said power source, said third switch connecting said second series combination across said first series combination when said DC load is driven by an AC power source.

14. An AC/DC power source apparatus comprising, in combination, a first series combination of a pair of thyristors and a semiconductor diode, a second series combination of another thyristor and another semiconductor diode, a bridge circuit including said first series combination connected across said second series combination with the same polarity, a third series combination of a reactor and a capacitor connected across one of said thyristors included in said first series combination, an AC power source connected between the junction of selected two of said two thyristors and said semiconductor diode in said first series combination and the junction of said another thyristor and said another semiconductor diode in said second series combination and a series circuit including a selected one of a battery said DC load and a combination of said battery and said DC load connected across the junctions of said first series combination and said second series combination interconnected in parallel circuit relationship.

* * * * *

UNITED STATES PATENT OFFICE
CERTIFICATE OF CORRECTION

Patent No. 3,984,753     Dated October 5, 1976

Inventor(s) Ryohei Uchida, Mitsuru Kitano and Yoshinobu Morimoto

It is certified that error appears in the above-identified patent and that said Letters Patent are hereby corrected as shown below:

In the first sheet, left column, line 5 "Yoshinoku Morimote" should read --Yoshinobu Morimoto--.

Signed and Sealed this

Eighth Day of March 1977

[SEAL]

Attest:

RUTH C. MASON
*Attesting Officer*

C. MARSHALL DANN
*Commissioner of Patents and Trademarks*